US012781134B2

(12) United States Patent
Oud

(10) Patent No.: US 12,781,134 B2
(45) Date of Patent: Nov. 3, 2026

(54) ETHYLENE PLANT, COMPRISING AN ELECTRICALLY-POWERED PYROLYSIS REACTOR AND A FEED-EFFLUENT HEAT EXCHANGER

(71) Applicant: TECHNIP ENERGIES FRANCE SAS, Nanterre Cedex (FR)

(72) Inventor: Peter Oud, Zoetermeer (NL)

(73) Assignee: TECHNIP ENERGIES FRANCE (FR)

( * ) Notice: Subject to any disclaimer, the term of this patent is extended or adjusted under 35 U.S.C. 154(b) by 191 days.

(21) Appl. No.: 18/699,813

(22) PCT Filed: Oct. 13, 2022

(86) PCT No.: PCT/EP2022/078585
§ 371 (c)(1),
(2) Date: Apr. 9, 2024

(87) PCT Pub. No.: WO2023/062165
PCT Pub. Date: Apr. 20, 2023

(65) Prior Publication Data

US 2024/0400912 A1 Dec. 5, 2024

(30) Foreign Application Priority Data

Oct. 14, 2021 (EP) .................................... 21290066

(51) Int. Cl.
*C10G 9/24* (2006.01)
*B01J 19/08* (2006.01)
*C10G 9/36* (2006.01)

(52) U.S. Cl.
CPC .............. *C10G 9/24* (2013.01); *B01J 19/087* (2013.01); *C10G 9/36* (2013.01);
(Continued)

(58) Field of Classification Search
CPC .... C10G 9/24; C10G 9/36; C10G 2300/1037; C10G 2300/4006; C10G 2300/4081;
(Continued)

(56) References Cited

U.S. PATENT DOCUMENTS

| | | | |
|---|---|---|---|
| 7,288,690 | B2 | 10/2007 | Bellet et al. |
| 2007/0007171 | A1 | 1/2007 | Strack et al. |
| 2021/0171836 | A1 | 6/2021 | Purola |

FOREIGN PATENT DOCUMENTS

| | | | | |
|---|---|---|---|---|
| CN | 110330998 A | 10/2019 | | |
| EP | 3 249 028 A1 | 11/2017 | | |
| EP | 3 730 592 A1 | 10/2020 | | |
| EP | 3725865 A1 * | 10/2020 | | C10G 9/24 |

(Continued)

OTHER PUBLICATIONS

United Arab Emirates Application No. P2024-00910, Substantive Examination Report mailed on Nov. 17, 2025, 9 pages.

(Continued)

*Primary Examiner* — Ellen M Mcavoy
*Assistant Examiner* — Chantel Graham
(74) *Attorney, Agent, or Firm* — Kilpatrick Townsend & Stockton LLP

(57) ABSTRACT

An ethylene plant comprising an electrically-powered pyrolysis reactor and a process for producing a pyrolysis reactor effluent using the ethylene plant. The pyrolysis reactor comprises a feed inlet for a hydrocarbon feedstock-diluent mixture and an outlet for a pyrolysis reactor effluent comprising ethylene. The plant further comprises a heat exchanger configured to transfer heat from the pyrolysis reactor effluent to the feed for the pyrolysis reactor. The heat exchanger comprises a feed inlet and a feed outlet upstream of the pyrolysis reactor, and further a pyrolysis reactor effluent inlet and a pyrolysis reactor effluent outlet. A feed passage way is present between the feed outlet of the heat exchanger and the feed inlet of the pyrolysis reactor and
(Continued)

further a feed passage way is present between the reactor effluent outlet of the pyrolysis reactor and the cracked gas inlet of the heat exchanger.

16 Claims, 14 Drawing Sheets

(52) U.S. Cl.
CPC ................. *B01J 2219/00103* (2013.01); *B01J 2219/00132* (2013.01); *C10G 2300/1037* (2013.01); *C10G 2300/4006* (2013.01); *C10G 2300/4081* (2013.01); *C10G 2300/805* (2013.01); *C10G 2400/20* (2013.01)

(58) Field of Classification Search
CPC .......... C10G 2300/805; C10G 2400/20; C10G 9/002; B01J 19/087; B01J 2219/00103; B01J 2219/00132
See application file for complete search history.

(56) References Cited

FOREIGN PATENT DOCUMENTS

| | | | |
|---|---|---|---|
| EP | 3748138 | A1 | 12/2020 |
| WO | 2015/197181 | A1 | 12/2015 |
| WO | 2021/052642 | A1 | 3/2021 |

OTHER PUBLICATIONS

European Application No. 21290066.6, Extended European Search Report mailed on Mar. 18, 2022, 7 pages.
International Application No. PCT/EP2022/078585, International Preliminary Report on Patentability mailed on Apr. 25, 2024, 7 pages.
International Application No. PCT/EP2022/078585, International Search Report and Written Opinion mailed on Jan. 16, 2023, 9 pages.
Chinese Application No. 202280068413.6, Office Action mailed on Apr. 25, 2026, 17 pages (8 pages of original document and 9 pages of English Translation).
European Application No. 21290066.6, Intention to Grant mailed on Feb. 17, 2026, 5 pages.

* cited by examiner

ETHYLENE PLANT, COMPRISING AN ELECTRICALLY-POWERED PYROLYSIS REACTOR AND A FEED-EFFLUENT HEAT EXCHANGER

The invention relates to an ethylene plant, comprising an electrically-powered pyrolysis reactor. The invention further relates to a process for producing ethylene from a hydrocarbon feed using an ethylene plant according the invention.

In conventional ethylene plants, comprising a fired cracking furnace, enough high pressure (HP) steam is generated to produce power to drive machines and in addition generate dilution steam to suppress the hydrocarbon partial pressure to improve product selectivity and keep coke formation at bay in the cracking reactor.

In the hot section of the plant the dilution steam is traditionally produced from medium pressure (MP) steam that is generated from the HP steam after generating power via one or more steam turbines. In addition, if a primary fractionator is available, which is known for cracking liquid feedstock, the heat recovery of furnace effluent (cracking product) in the quench oil circuit of the primary fractionator, which is a pump-around circuit of said primary fractionator, aids in the generation of dilution steam, allowing more MP steam to be let down to lower pressure levels for maximum power production. At the same time excess heat from the effluent can be recovered in a quench water tower and transferred to low-temperature users via a pump-around loop. This low-level heat is for instance used to preheat furnace feedstock. Further feedstock evaporation is usually done by means of flue gas in the convection section of said conventional cracking furnaces.

FIG. 1 shows an example of a scheme for a (hot part of) a conventional, fired, ethylene plant for gaseous hydrocarbon feedstocks. Fresh gaseous feedstock 1, such as ethane, propane or a mixture thereof, is first preheated in a preheater 30 with a low-temperature heat source such as the quench water external to the cracking furnace 1000 to heat it up from ambient condition to a temperature of approximately 50° C. suitable to enter the cracking furnace 1000. Further preheat of the feedstock is achieved by flue gas in the convection section of the furnace, by a hydrocarbon feedstock preheater 31. To suppress the hydrocarbon partial pressure in the pyrolysis reactor, which is beneficial for the product yield and for suppressing coke formation, mildly superheated dilution steam 24 is added. Feedstock and dilution steam are preheated to such an extent that once mixed they are above the water dew point, being roughly 120-130° C. Further superheat of the steam diluted hydrocarbon feedstock 3 is achieved in the feedstock superheater in the convection section of the furnace 33 using flue gas. Once suitably superheated, the steam diluted feedstock enters the pyrolysis reactor 34 at approximately 650° C.-730° C. This reactor is traditionally heated by combusting fuel gas in a firebox. The reactor operates at relatively low pressure and high temperature as this is favourable for the olefin yield. Typical operating conditions at the reactor outlet are 800° C. thru 870° C. and a pressure of 1.6 thru 2.2 bara, yielding product like ethylene, propylene, butadiene, benzene, toluene and xylene. Typical by-products are hydrogen, methane, gasoline and fuel oil. Some of the products are recycled to the reactor such as ethane and propane. The reactor effluent 4 contains all these products and by-products. This reactor effluent 4 is cooled to approximately 160° C. to 220° C. within the cracking furnace section 1000. The heat from the effluent above 350° C. is traditionally recovered using a first transfer line exchanger 35 by generating saturated high pressure steam of around 100 thru 125 bara. The lower level heat can be recovered in a secondary transfer line exchanger 36 to preheat boiler feed water or superheat steam diluted feedstock.

From the furnace section the effluent 4 is sent to the hot separation section of the plant, mainly consisting of the water quench tower 60, the sour water stripper 70 and the dilution steam drum 80. In the water quench tower 60, the effluent 4 is further cooled to approximately ambient conditions. Cooling is done using a pump around circuit, that collects the accumulated water bottom product, the so-called quench water 14, and injects it at various levels in the quench tower 60. The quench water circuit usually has two stages, the quench water bottom cooling circuit 64, serving the quench water tower bottom section 61 and the quench water top cooling circuit 66, serving the quench water tower top section 62. The top product, the cooled gaseous phase of the reactor effluent, called the cracked gas 9, is sent to the down-stream cracked gas compression section to be further separated in a cold separation unit. The quench water bottom circuit coolers 65 are typically process users to recover as much of the quench water duty as possible. Such users are for instance the feedstock preheater 30. Any excess heat has to be removed by air cooling or cooling water cooling. The quench water top circuit coolers 67 typically remove excess heat using cooling water. The cooled injected water from the pump around circuit is used within the quench water tower to remove the heat from the cracked gas by direct heat exchange over suitable tower internals. The main duty of this tower, apart from cooling the cracked gas, is the condensation and recovery of the dilution steam. The condensed dilution steam is the nett product from the tower's bottom, in addition to a small stream of heavy pyrolysis gasoline product 8. These are usually separated from each other using a gasoline/water separator 63. Sometimes this separator also collects the quench water 14 for the quench water circuit. This condensed dilution steam, called sour water 20, contains sour gases, which are stripped of by strip steam 21 in the sour water stripper 70. These sour gases 22 are returned to the quench water tower 60. The stripped water, called process water 23 is suitable for dilution steam generation. This happens at a higher pressure, roughly 6 thru 7 bara, in order to be able to send it back to the cracking furnaces. The dilution steam generation is achieved using middle pressure steam as heat source. The process water is collected in the dilution steam drum 80 and via a thermosyphon circuit dilution steam 24 is generated from the condensing medium pressure steam in the dilution steam generator 81. Any superheat in the middle pressure steam is used to mildly superheat the dilution steam in the dilution steam superheater 83 to a temperature of 180° C. thru 210° C. before returning it to the cracking furnace 1000 to dilute the hydrocarbon feedstock 1. A blow-down 26 from the dilution steam drum 80 and a dilution steam system make-up 25 to said drum prevent accumulation of fouling contaminants in the dilution steam generation circuit.

The integrated power generation scheme of a conventional ethylene plant is shown in FIG. 2. The MP steam required for the dilution steam generation is generated in the high pressure steam system from boiler feed water. Boiler feed water is made from demineralized water 101 in the deaerator 120, where it is steam stripped by stripping steam 102 to remove $CO_2$ and oxygen via the deaerator vent 103. The produced boiler feed water 104 is preheated in the cracking furnace 1000 by a boiler feed water preheater 121, either by the cracked gas or the flue gas or both, and is collected in a high pressure steam drum 122. The steam drum being connected by natural circulation with a thermo syphon type of heat exchanger, called the transfer line exchanger 35 recovers heat from the reactor effluent 4 and generates saturated high pressure steam 105, this high pressure steam is superheated by flue gas in the convection section of the furnace 1000 using a high pressure steam superheater 123. The superheated high pressure steam is used to generate the power to drive the main machines in the separation section of the ethylene plant, such as the cracked gas compressor and the refrigeration compressors, respectively present in the cracked gas compressor area and the cold separation section of the plant (not shown for clarity reasons). For this purpose the superheated high pressure steam 107 is reduced in pressure using a back-pressure steam turbine from high pressure to medium pressure to generate power 124 and a condensing turbine from medium pressure to vacuum 125, also to generate power. Most of the steam 110 is condensed in the surface condenser 126 of the condensing turbine 125 to maximize the power output, but some steam 108 is reduced only to medium pressure level. This medium pressure steam 108 is used for dilution steam generation and represents a considerable percentage of the total high pressure steam flow 107 made available. The medium pressure steam 108 is desuperheated in the dilution steam superheater 83 to superheat dilution steam and condensed in the dilution steam generator 81 to generate dilution steam 24. The medium pressure condensate 109 produced as well as the vacuum condensate 111 are combined and the combined condensate 112 is returned to the deaerator to be recycled as boiler feed water. A small blow-down 106 from the high pressure steam drum prevents accumulation of fouling contaminants in the high pressure steam circuit.

The hot section of a plant flow scheme for a process making use of liquid hydrocarbon feedstock is shown in FIG. 3. In a typical liquid feedstock ethylene plant fresh liquid feedstock 2, such as butane, pentane or naphtha or a mixture thereof is first preheated in a preheater 30 with a low-temperature heat source such as the quench water external to the furnace 1000 to heat it up from ambient condition to a temperature of approximately 50° C. suitable to enter the cracking furnace 1000. Further preheat and partial evaporation of the feedstock is achieved by flue gas in the convection section of the furnace, by a hydrocarbon feedstock preheater 31 and by a hydrocarbon feedstock evaporator 32 respectively. To suppress the hydrocarbon partial pressure in the pyrolysis reactor, which is beneficial for the product yield and for suppressing coke formation, the dilution steam 24 coming from the hot separation section is additionally superheated in the convection section using flue gas. This is done in the dilution steam superheater 84 to ensure full vaporization of the partially evaporated feedstock once mixed. Feedstock is evaporated and dilution steam is heated to such an extent that the mixture is well above the water dew point, being roughly 130-140° C. Further superheat of the steam diluted hydrocarbon feedstock 3 is achieved in the feedstock superheater in the convection section 33 of the furnace using flue gas. Once suitably superheated, the steam diluted feedstock enters the pyrolysis reactor at approximately 600° C.-640° C. This reactor is traditionally heated by combusting fuel gas in a firebox. The reactor operates at relatively low pressure and high temperature as this is favourable for the olefin yield. Typical operating conditions at the reactor outlet are 800° C. thru 870° C. and a pressure of 1.6 thru 2.2 bara, yielding product like ethylene, propylene, butadiene, benzene, toluene and xylene. Typical by-products are hydrogen, methane, gasoline and fuel oil. Some of the products are recycled to the reactor such as ethane and propane. The reactor effluent contains all these products and by-products.

This reactor effluent 4 is cooled to approximately 350° C. within the cracking furnace section 1000. The heat from the effluent above 350° C. is traditionally recovered using a first transfer line exchanger 35 by generating saturated high pressure steam of around 100 thru 125 bara. Lower level heat, between 350° C. and 160° C. can't be recovered using indirect heat exchange, due to the fouling nature of the effluent, but is recovered in a so-called quench oil fitting 37 using a quench oil injection 27 and a middle oil injection 28, if the middle oil loop is available. From the furnace section the effluent 4 is sent to the hot separation section of the plant, mainly consisting of the primary fractionator 50, the water quench tower 60, the sour water stripper 70 and the dilution steam drum 80.

In the primary fractionator 50 the effluent is further cooled to approximately 100° C., maintaining a temperature above the dew point of water to ensure no water condenses in this tower. The effluent is subsequently cooled using the quench oil and the middle oil pump-arounds and the gasoline reflux respectively. The quench oil cooling circuit 54 originates from the heavy fuel oil product 6 collected in the bottom of the tower. This quench oil 10 is cooled by the quench oil circuit coolers 55. Part of it is sent to the quench oil fitting 27 and the rest is re-injected into the tower below the middle oil total draw off tray. The quench oil circuit coolers 55 are usually used to generate dilution steam in dilution steam generator 82. If the primary fractionator bottom temperature is not sufficient to generate dilution steam, low pressure steam can be generated instead. The quench oil cooling circuit 54 recovers all heat from the effluent above typically 170° C. to 180° C., if the middle oil cooling circuit 56 is present, otherwise it recovers heat from the effluent down to 125° C. to 130° C. The quench oil cooling circuit serves the primary fractionator wash section 51, the column's bottom section.

The middle oil cooling circuit 56 is optional and is meant to provide a relatively clean/non-fouling intermediate cooling circuit that is recovering lower level heat from the effluent than the quench oil circuit 54, typically down to 125° C. to 130° C. The middle oil 11 is collected on a draw off tray in the bottom of the primary fractionator middle oil section 52, located above the wash section 51 in the tower. A middle oil reflux 12 is sent to the quench oil wash section 51 in the bottom of the tower, to be able to shift quench oil duty to the middle oil loop. In addition, a middle oil stream 28 is sent to the quench oil fitting 37. The rest is cooled by the middle oil circuit coolers 57 and returned to the tower below the light fuel oil draw of point. The middle oil cooling circuit 56 serves the primary fractionator middle oil section 52.

The gasoline reflux 13 coming from the gasoline/water separator 63 is handling the recovery of the heat in the top of the tower, the primary fractionator gasoline reflux section 53, and shifts the recovered duty to the quench water circuit.

Suitable internals are installed in the tower to efficiently transfer heat from the effluent to the injected quench oil, middle oil and gasoline reflux. In addition to cooling the effluent, light oil and heavy oil fractions are condensed in the primary fractionator. The heavy fuel oil 6 is collected in the bottom section 51, while the light fuel oil 7 is collected in the bottom of the reflux section 53 on the light oil draw-off tray. These can be stripped to control the flash point of the total fuel oil product 5 and/or to recover lighter quench oil fractions for viscosity control of the quench oil circuit.

In the water quench tower 60, the effluent 4 is further cooled to approximately ambient conditions. The top product, the cooled gaseous phase of the reactor effluent, called the cracked gas 9 is sent to the down-stream units for further separation. Cooling is done using a pump around circuit, that collects the accumulated water bottom product, the so-called quench water 14, and injects it at various levels in the quench tower 60. The quench water circuit usually has two stages, the quench water bottom cooling circuit 64, serving the quench water tower bottom section 61 and the quench water top cooling circuit 66, serving the quench water tower top section 62. The quench water bottom circuit coolers 65 are typically process users to recover as much of the quench water duty as possible. Such users are for instance the feedstock preheater 30 and/or the propylene splitter reboiler (not shown). Any excess heat has to be removed by air cooling or cooling water cooling. The quench water top circuit coolers 67 typically remove excess heat using cooling water. The cooled injected water from the pump around circuit is used within the quench water tower to remove the heat from the cracked gas by direct heat exchange over suitable tower internals. The main duty of this tower, apart from cooling the cracked gas, is the condensation and recovery of the dilution steam. The condensed dilution steam is the nett product from the tower's bottom, in addition to the small stream of heavy pyrolysis gasoline product 8. These are usually separated from each other using an gasoline/water separator 63. Sometimes this separator also collects the quench water for the quench water circuit. This condensed dilution steam, called sour water 20, contains sour gases, which are stripped of by strip steam 21 in the sour water stripper 70. These sour gases 22 are returned to the quench water tower 60. The stripped water, called process water 23 is suitable for dilution steam generation. This happens at a higher pressure, roughly 6 thru 7 bara, in order to be able to send it back to the cracking furnace. The dilution steam generation is achieved using middle pressure steam. The process water is collected in the dilution steam drum 80 and via a thermosyphon circuit dilution steam 24 is generated from the condensing medium pressure steam in the dilution steam generator 81 and additionally from the quench oil cooling circuit using dilution steam generator 82. Any superheat in the middle pressure steam is used to mildly superheat the dilution steam in the dilution steam superheater 83 to a temperature of 180° C. thru 210° C. before returning it to the cracking furnace 1000 to dilute the hydrocarbon feedstock 2. A blow-down 26 from the dilution steam drum 80 and a make-up 25 to said drum prevent accumulation of fouling contaminants in the dilution steam generation circuit. The MP steam required for the dilution steam generation is generated in the high pressure steam system from boiler feed water in the same way as for the conventional gaseous ethylene plant flow scheme as shown in FIG. 2 and described above.

Considering the need to reduce greenhouse gas emissions, such as emissions of carbon dioxide and of methane, there is considerable interest in improving ethylene plants and processes for operating ethylene plants allowing the reduction of energy requirements or at least a reduction of fossil fuel requirements for generating the needed heat to operate the plants.

A possible approach could be to replace fossil fuels by hydrogen, which may be produced by electrolysis. The required electricity can be produced making use of renewable energy sources or in a power plant wherein carbon dioxide is effectively captured, to prevent emissions into the air.

The present inventors realised that it would also be interesting to use electricity directly to provide a part of the sensible heat (heat to increase the temperature of the hydrocarbon-steam mixture) and the heat of reaction for the cracking reaction. However, when applying electrified pyrolysis reactors feedstock pre-heating and evaporation of liquid feedstock cannot be performed in the traditional way, because flue gas as hot utility is absent. Neither can the dilution steam be generated in the traditional way, in the absence of MP steam.

The idea of using electrically heated pyrolysis reactors for the production of olefins from hydrocarbons is known in the art. EP 3 249 028 A1 relates to a method for producing olefins by steam cracking, wherein a plurality of cracking tubes are employed. At least one of the cracking tubes is heated by combustion of a fuel (i.e. a fired cracking tube) and at least one other cracking tube is heated electrically. The reactor effluent (cracking product) is rapidly cooled (quenched) to avoid undesired side-reactions. Further downstream processing is described, such as fractionation of the cracking product. Little information is disclosed about pre-heating the feedstock and the generation of dilution steam. Since the process requires fuel combustion, hot flue gas will be available for heating; it is mentioned to feed steam directly to the cracking tubes and it is mentioned to generate steam inside the cracking tube.

EP 3 730 592 A1 relates to an olefin synthesis plant, comprising a pyrolysis section comprising one or more of the following: a feed pre-treatment section, one or more pyrolysis reactors for cracking hydrocarbons in the presence of a diluent, a primary fractionation and compression section and/or a product separation section, wherein-compared to a conventional plant-more of the energy and/or the net energy required by the plant of a section thereof, is provided by a non-carbon based energy source. EP 3 730 592 A1 suggests generally various options for employing electricity, heating the feed and generating dilution steam, when used. For example, the plant may be a plant configured for a steam cracking process, wherein e.g. a part or all of the cracking reactors are electrically heated and wherein the heat for the vaporisation of the recycle water to make diluent steam is generated by electricity. Further, the feed into the cracking reactor can be electrically pre-heated; it can be heated using much of the heat recovered from cooling the hot product gases; or it can be heated indirectly using a heat transfer agent (e.g. Dowtherm or steam). Although some written examples are provided of specific embodiments, figures illustrating the relative position of units and streams between units, e.g. to clarify how heat recovery of process streams is effected, are lacking. The examples rely on generation of dilution steam from the effluent directly. The design appears restricted to processing of ethane feedstock due to the low fouling properties of the effluent as compared to processes running on heavier feedstock.

It is an object of the present invention to provide a new ethylene plant, comprising an electrically-powered pyrolysis reactor, respectively a new process for producing ethylene by steam cracking, which is robust in feedstock tolerances while effective in reducing carbon dioxide emissions without needing to use combustion of a fuel (such as methane or hydrogen) to provide a part of the heating of the hydrocarbon feed to the electrically-powered pyrolysis reactor. It is in in particular an object to integrate an electrically-powered pyrolysis reactor in an ethylene plant such that this is achieved without the availability of high pressure steam as a source for dilution steam and without the availability of high pressure steam as a heating medium for the hydrocarbon feed.

It has now been found that it is possible to efficiently integrate electrically-powered pyrolysis devices and a feed-effluent heat exchanger to recover sufficient heat from the effluent of said pyrolysis reactor (cracking product). In particular this is accomplished by superheating the feed for the pyrolysis reactor (a hydrocarbon feedstock dilution steam mixture), with the down-stream hot separation section of the plant, such that excess electric power is minimal. Excess power being understood as power in addition to the power requirements for the electrically-powered pyrolysis reactor, that is the power required to preheat, evaporate and optionally superheat the feedstock and the power required for the generation of dilution steam or humidification of the feedstock. Additional power required for driving the machines in the back-end of the plant, such as the cracked gas compressor and the refrigeration compressors may be handled as taught in EP3748138A1.

Accordingly, the present invention relates to an ethylene plant comprising an electrically-powered pyrolysis reactor, which electrically-powered pyrolysis reactor comprises a feed inlet for a hydrocarbon feedstock-diluent mixture and an outlet for a pyrolysis reactor effluent comprising ethylene, the ethylene plant further comprising a heat exchanger configured to transfer heat from the pyrolysis reactor effluent to the feed for the pyrolysis reactor, the heat exchanger comprising a feed inlet and a feed outlet upstream of the pyrolysis reactor, and further a pyrolysis reactor effluent inlet and a pyrolysis reactor effluent outlet. In a preferred embodiment, a feed passage way is present between the feed outlet of the heat exchanger and the feed inlet of the pyrolysis reactor and further a feed passage way is present between the reactor effluent outlet of the pyrolysis reactor and the cracked gas inlet of the heat exchanger. In this way generation of high pressure steam by heat transfer from reactor effluent can be minimized, even eliminated, allowing the plant to operate without generation of high pressure steam from heat transferred from reactor effluent.

Advantageously the temperature of the pyrolysis reactor effluent coming out of the heat exchanger can be at a temperature well below a range for very high pressure stream generation, typically well below 500° C., preferably below 450° C.

In another or further preferred embodiment, as will be explained in more detail hereinbelow, heat can be used to preheat the feed prior to the heat exchanger using heat from a downstream processing unit wherein reactor effluent is further cooled.

Further, the invention relates to a process for producing a pyrolysis reactor effluent comprising ethylene from a hydrocarbon feed using an ethylene plant according to the invention. The process comprising feeding a hydrocarbon feedstock-steam mixture to the electrically-powered pyrolysis reactor, cracking the hydrocarbon feedstock in the presence of steam in the electrically-powered pyrolysis reactor of said ethylene plant to produce the pyrolysis reactor effluent comprising ethylene, feeding the pyrolysis reactor effluent to the heat-changer configured to transfer heat from the pyrolysis reactor effluent to the hydrocarbon feedstock-steam mixture, prior to the cracking of the hydrocarbon feedstock, and transferring heat from the pyrolysis reactor effluent to the hydrocarbon feedstock-steam mixture in said heat exchanger, thereby cooling the pyrolysis reactor effluent to a temperature at the heat-exchanger pyrolysis reactor effluent outlet, preferably below 500° C., more preferably to a temperature below 450° C., e.g. in the range of 300° C.-450° C., even more preferably to a temperature in the range of 325° C.-425° C.

BRIEF DESCRIPTION OF DRAWINGS

These and other features, aspects, and advantages of the apparatus, systems and methods of the present disclosure will become better understood from the following description, appended claims, and accompanying drawing wherein:

The invention in particular provides a number of alternatives solutions for operating an ethylene plant that lacks a high pressure steam generation system and that lacks a fired furnace wherein flue gas is formed. Thus, the plant or process according to the invention is in particular suitable to be operated, while neither a feedstock preheating and evaporation by heating with flue gas is available nor dilution steam superheating. This is accomplished in particular by exploiting other heat integration measures within the ethylene plant. Hereby, the need for extra electrical power in addition to the electrical power for use in the pyrolysis reaction can be limited. For instance, at least in a number of embodiment, the plant can be operated during normal operation (steady state) without using electric power to create dilution steam, without electric pre-heating of feedstock etc. Thereby, the use of electrical power can remain relatively limited, without compromising on greenhouse gas emissions. This is advantageous, especially when desiring to rely on renewable electricity sources, of which the supply can be highly variable, depending on—for instance—weather conditions.

The skilled person will be able to design and operate suitable operational units of the ethylene plant, using the present disclosure in combination with common general knowledge and optionally one or more of the references cited herein. In addition to the operational units, passage ways etc. described herein, a plant according to the invention may comprise one or more further units. Such units may be based on units for such purpose generally known in the art or described in the references cited herein. In view of conciseness, such units, which may be conventional, are not discussed in detail. In particular, upstream of the feedstock feed 1,2 one or more units may be present, such as one or more units configured to pre-treat the feedstock, e.g. to remove impurities. In particular downstream of the hot section (downstream of line 9 in the Figures) one or more units may be present to purify the cracked product gas or to recover a useful product from it, e.g. to recover hydrogen or methane from it.

Figure 4:
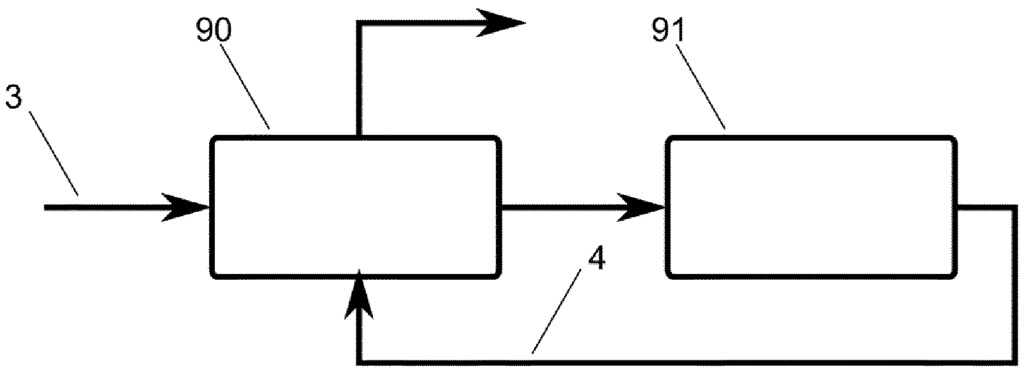
FIG. 4 schematically illustrates aspects of an electrically-powered pyrolysis reactor in combination with a feed-effluent heat exchanger.

In accordance with the invention, the electrically-powered pyrolysis reactor 91 is combined with a feed-effluent heat exchanger 90 configured to transfer heat from pyrolysis reactor effluent 4 to pyrolysis reactor feed 3, i.e. a mixture of hydrocarbon feedstock and diluent (typically dilution steam), prior to entry of the feed into the pyrolysis reactor. This is schematically shown in FIG. 4.

Such heat exchangers are generally known in the they art; they can, e.g., have a shell and tube design. Usually, the feed-effluent heat exchangers are operated in a counter-flow configuration. As such there is usually a temperature crossing, i.e. the outlet temperature on the cold side exceeds the outlet temperature on the hot side. In principle a cross-flow is also possible. The feed-effluent exchanger typically has a passage way for reactor effluent (cracking product) and a separate passage way for the feed (hydrocarbon-steam mixture). Both passage ways are separated by a heat-conductive partition an arranged to transfer heat from one passage way to the other. Thus, waste heat from the reactor effluent is used directly to heat up the feed, whereby none of the reactor effluent duty is used for high pressure steam generation. Thus, the ethylene plant of the invention is typically configured to be able to operate in the absence of a high pressure steam generator. The feed-effluent heat exchanger 90 is also distinct from a quenching device, e.g. a quench water tower, wherein reactor effluent is typically brought in direct contact with a quenching medium, such as quenching water. A quenching device configured for further cooling of the reactor effluent (cracking product), downstream of the feed-effluent exchanger 90 is advantageously provided, as will be discussed in more detail below.

The invention allows the cracking of gaseous feedstocks, liquid feedstocks and mixtures thereof without needing combustion of a hydrocarbon fuel to generate sensible heat or reaction heat for the pyrolysis reaction, allowing an essentially complete avoidance of direct $CO_2$ emissions (essentially no $CO_2$ produced in the plant), ready for the introduction of renewable power sources. Provided that the generation of dilution steam and the superheating of gaseous feedstock and/or the preheating, evaporation of liquid feedstock is performed with the minimal addition of electric power requirements, $CO_2$ emissions can be kept to a minimum. This, to facilitate nett zero emission targets for the ethylene industry in an as efficient way as possible.

The electrified pyrolysis device for producing olefins in ethylene plants can be based on known electrically heated pyrolysis reactors. E.g. the pyrolysis reactor may be a directly heated reactor, wherein the reactor wall (such as a the wall of a cracking coil) is heated by resistive heating using the wall the electric conductor. E.g. WO2015/197181 A1 describes a device and method for heating a fluid in a pipeline (cf. cracking reactor tube) in a context of steam reforming. This principle may be employed for the pyrolysis reactor in accordance with the invention. It should be noted that for cracking in accordance with the present invention, the space wherein the pyrolysis takes place is generally free of a catalyst material. In addition the operating pressure where the pyrolysis takes place is considerably lower than the 10 bar to 50 bar present in the reformer tubes. Indirect resistive heating of the cracking coil by electric heating the housing wherein the cracking coil (typically a plurality thereof) is present. Further, a rotodynamic device (RDR) is very suitable, in particular to supply the sensible duty and the reaction duty for the pyrolysis reaction by raising the kinetic energy via static and dynamic rotors, thus transferring the electric power of the machine driver to convey the duty to the reactive mixture (See e.g. US2021/0171836A1). A known supplier of RDR's is Coolbrook (Helsinki, Finland; Geleen, the Netherlands).

Yet another example of a suitable pyrolysis reactor is based on U.S. Pat. No. 7,288,690B2 (see in particular claims 8 thru 13). Instead of the feed-effluent exchanger, the waste heat boiler of the cogenerator is used to preheat the diluted feedstock and the power generated in the electric alternator is used to power the pyrolysis reactor. Suitable heating methods include direct resistance heating, also known referred to as Joule heating, inductive heating, and ultrasound.

The electricity required for the ethylene plant according to the invention can be retrieved from an electric power system which is part of the plant or the ethylene plant can have an electric power connection to an electric power system outside the plant. At least a substantial part of the electric power, preferably essentially all electric power, is received from a renewable source; this to minimize $CO_2$ emissions. Thus the electrical power connection between the energy consuming part of the ethylene part, in particular the pyrolysis reactor (91), and the electric power system can be a connection to the ethylene plant's internal power grid to supply at least part of the required power or it can be a connection to an external (remote) power plant which is connected to the same electric grid as the ethylene plant according to the invention.

The electrical power system providing electricity from a renewable source comprises usually one or more power systems selected from the group consisting of wind power systems, solar energy systems, hydropower systems, geothermal energy systems and osmotic power systems (also known as blue energy). Alternatively, or in addition use can be made of one or more systems configured to generate electricity from biomass and/or one or more systems configured to generate electricity from a bio-renewable fuel, e.g. bio-ethanol or biodiesel.

Although the use of renewable energy is preferred, in principle electric power or a part thereof can be retrieved from a different source. Such plant still benefits from the improved heat integration. E.g. the reactor effluent of a steam cracking furnace usually contains some methane and some hydrogen. These can be recovered from the reactor effluent as a methane rich stream and a hydrogen rich stream. Either of these or both can be used to generate electricity in a manner known per se. For hydrogen this does not result in increased $CO_2$ emissions. If methane is combusted under formation of $CO_2$, this can be captured to prevent emission into the environment. However in an advantageous embodiment, methane, hydrogen or both can be used for higher value purposes, e.g. as a raw material for another chemical process.

In a process according to the invention, the weight to weight ratio diluent gas (steam) to hydrocarbon feedstock, also referred to as the dilution steam (weight) ratio, may be chosen within wide limits. Usually said ratio is, depending on feedstock, chosen within the range of about 0.25 to about 1.0, preferably within the range about 0.35 to 0.9, more preferably within the range of 0.4 to 0.8.

For example, for gaseous feedstock, the dilution steam ratio is generally relatively low, typically 0.3 thru 0.4. For light liquid feedstock, such as naphtha, a higher ratio may be preferred, typically in the range from 0.4 thru 0.6. Heavier feedstock, e.g. gas oils are typically operated under higher dilution steam ratios, 0.6 thru 1.0. In general higher dilution steam ratios are possible, but economically unattractive. Lower values are less preferred as these may cause yield degradation and fouling. The mixture of hydrocarbon feedstock and dilution steam 3 is generally fed into the feed-effluent heat exchanger 90 at a temperature above the water dew point. In quantitative terms, the temperature of the mixture of hydrocarbon feedstock and diluent at the inlet of the feed-effluent heat exchanger 90 is generally, depending on feedstock, in the range of 80° C.-230° C., preferably in the range of 120° C.-180° C. For example, in case the mixture is steam diluted gaseous feedstock, coming from a humidifier, the temperature is preferably in a range of 80° C.-150° C., more preferably between 90° C. and 130° C. If a compressor is applied in addition to the humidifier, to compress the steam diluted gaseous feedstock to the furnace inlet pressure, the operating temperature can be raised, generally with as much as 60-120° C., depending on the compressor's polytropic efficiency and discharge pressure. For steam diluted liquid feedstock, the temperature is preferably in a range of 120° C.-200° C., more preferably between 130° C. and 180° C. Providing the diluted feed inlet at a temperature within the specified ranges as opposed to superheating the feed to higher temperatures prior to entering the feed-effluent exchanger advantageously reduces electric power requirements.

In said heat exchanger, the mixture of hydrocarbon feedstock and diluent is heated, depending on feedstock, by heat from the pyrolysis reactor effluent, generally to a temperature at the inlet of the pyrolysis reactor (91) in the range of 550° C.-750° C., preferably in the range of 570° C.-730° C. For example, in case the mixture is steam diluted gaseous feedstock such as ethane or propane the coil inlet temperature is preferably in a range of 630° C.-750° C., more preferably 650° C. thru 730° C. Liquid feedstock preferably has a coil inlet temperature in a range of 550° C.-670° C., more preferably between 570° C. and 650° C. For ethane it was found that preheating to 730° C. is possible without fouling of the upstream convection section.

It is not necessary to heat the hydrocarbon feedstock-steam mixture to the temperature at which the pyrolysis is carried out. Part of the sensible heat is usually supplied to the mixture, using electric power in the pyrolysis reactor, which also provides the heat of reaction. In the feed-effluent heat-exchanger 90 the mixture is superheated; having a relatively low temperature of the feed mixture at the inlet of the heat-exchanger allows the recovery of a large part of the excess heat of the reactor effluent, whereby the needed electric power for further heating the feed inside the pyrolysis reactor is reduced.

The temperature of the reactor effluent (cracking product), at the heat-exchanger 90 cracking product inlet, depends on residence time inside the reactor. For the RDR this is relatively low, resulting in relatively higher coil outlet temperatures compared to conventional radiant coils. Also the feedstock plays an important role. Gaseous feedstock has a lower conversion than liquid feedstock such as naphtha and is cracked at a relatively lower coil outlet temperature. The temperature of the effluent at the inlet of the heat-exchanger 90 can range from 770° C. to 900° C. The reactor effluent (cracking product), at the heat-exchanger 90 cracking product outlet generally has a temperature of at least 125° C., preferably 150° C.-250° C. above the feed side outlet temperature of the feed-effluent exchanger. The reactor effluent (cracking product), at the heat-exchanger 90 cracking product outlet generally has a temperature of at least 150° C., preferably 175° C.-275° C. above the temperature of the diluted feed at the feed inlet of the feed-effluent exchanger. Generally, the temperature of the reactor effluent at the cracking product outlet of the heat exchanger 90 is 500° C. or less, preferably in the range of 300° C.-450° C., more preferably in the range of 325° C.-425° C. If a compressor is applied in addition to the humidifier, to compress the steam diluted gaseous feedstock to the furnace inlet pressure, this operating temperature can be raised, generally with as much as 40-100° C., depending on the compressor's polytropic efficiency and discharge pressure.

The ethylene plant according to the invention, typically further comprises a cooling section configured to further cool cracking product, after it leaves the feed-effluent heat exchanger 90. The cooling section may also be referred to as the hot section of the plant. Generally, the ethylene plant of the invention is advantageously operated without a high pressure steam generator. Thus, in the cooling section, the pyrolysis reactor effluent is further cooled to about ambient conditions (outdoor temperature) without substantial high pressure steam generation. Suitable devices to cool the pyrolysis reactor effluent are known in the art as such, and may—amongst others—be selected from water quenching devices, oil quenching devices and air coolers. Preferably, the plant comprises at least one device selected from the group consisting of water quenching devices and oil quenching devices. As will be discussed below, such devices not only are effective in cooling; they can also be employed in the purification or fractionation of the product, which can also be based on principles known in the art. Moreover, the inventors realised that a stream used in water quenching, oil quenching or both, can be employed to address the problem of a lack of high pressure steam generation, in particular to provide dilution steam. Instead of making use of dilution steam as a (hot) stream that is mixed with hydrocarbon feed, in accordance with the invention, it is possible—during normal operation—to humidify, in particular saturate, a feedstock with water (liquid), making use of a humidifier (which term is used interchangeably herein with the term saturator). Water originating from a water quenching device can be used as a source for the water for the humidification of the feedstock. Such method is in particular advantageous for humidifying at least substantially gaseous feedstocks. When using a humidifier, dilution steam is generally not needed during regular operation, but may be useful for start-up, decoke, hot standby and back-up operation. Accordingly, in a plant/process comprising (the use of) a humidifier for humifying the feedstock, usually a dilution steam generator is provided. This can have a relatively small capacity, compared to a plant wherein dilution steam is used during normal operation. In particular, a dilution steam drum 80 with an electric boiler 85 can be provided to supply dilution steam 24 (see. e.g. FIG. 6). This will be further discussed below.

Figure 5:
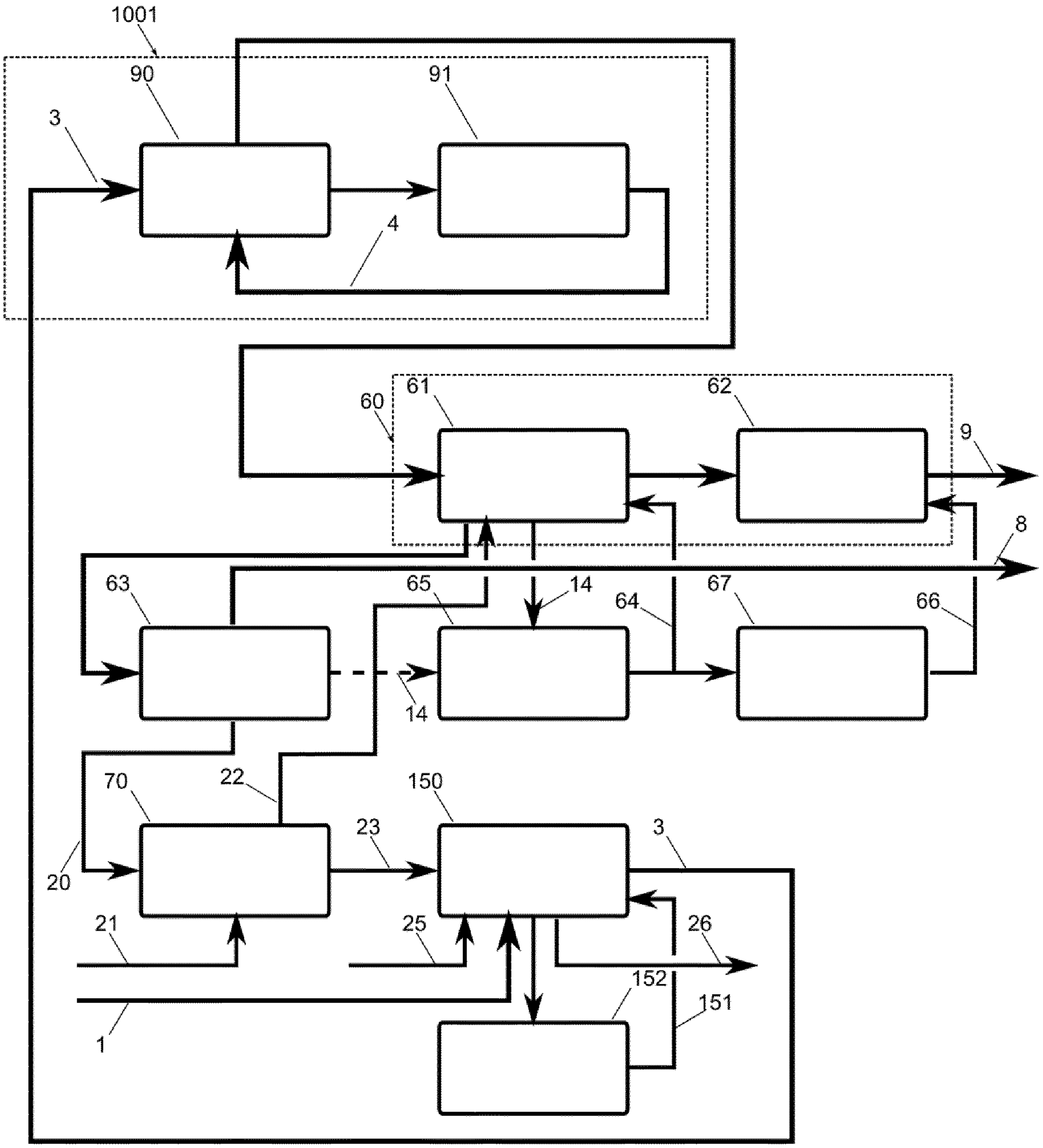
FIG. 5 schematically illustrates an ethylene plant/process in accordance with the invention.

FIG. 5 schematically shows a plant/process according to the invention illustrating how water quenching can be employed to cool the cracking product to about ambient conditions. Further, it shows how sour water (condensed dilution steam, containing acid gases, recovered during cooling and washing the cracking product in the water quench device) can be processed and used to provide the diluent, without needing high pressure steam.

From the furnace section 1001 the pyrolysis reactor effluent (cracking product) 4, cooled in feed-effluent heat exchanger 90 is sent to the hot separation section of the plant, comprising a water quench tower 60, a sour water stripper 70 and a humidifier (saturator) 150.

In the water quench tower 60, the effluent 4 is further cooled to about ambient conditions. This is usually done using a pump around circuit, that collects the accumulated water bottom product, the so-called quench water 14, and injects it at various levels in the quench tower 60. The quench water circuit usually has two stages, the quench water bottom cooling circuit 64, serving the quench water tower bottom section 61 and the quench water top cooling circuit 66, serving the quench water tower top section 62. The quench water bottom circuit coolers 65 are typically process users to recover as much of the quench water duty as possible.

Figure 14:
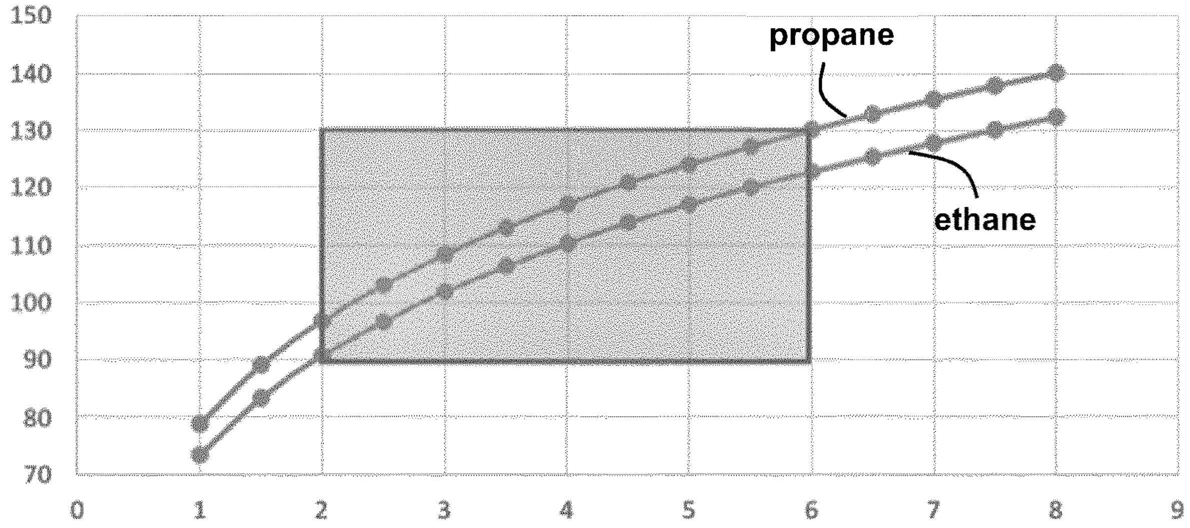
FIG. 14 depicts the dew point as function of absolute operating pressure in an exemplary saturator of an ethylene plant/process in accordance with the invention.

The plant can be operated without a feedstock preheater configured to pre-heat hydrocarbon feedstock prior to combining it with diluent (water/steam). The quench water duty is used to heat up the saturator water circuit 151, which in turn preheats and saturates the feedstock with water. Any excess heat in the quench water circuit is typically removed by air cooling or cooling water cooling. The quench water top circuit coolers 67 typically remove excess heat using cooling water. The cooled injected water from the pump around circuit is typically used within the quench water tower to remove the heat from the pyrolysis reactor effluent (cracking product) by direct heat exchange over suitable tower internals. The main duty of this tower, apart from cooling the cracking product, is the condensation and recovery of the dilution steam. The condensed dilution steam is the nett product from the tower's bottom, in addition to a stream of gasoline product (which, for gaseous feedstock, is generally small, relative to the stream of condensed dilution steam). These are usually separated from each other using an gasoline/water separator 63. This separator may also be used to collect quench water 14 for the quench water circuit. This condensed dilution steam, called sour water 20, contains dissolved sour gases, which are usually stripped of by strip steam 21 in the sour water stripper 70. These sour gases 22 are returned to the quench water tower 60. The stripped water, called process water 23 is suitable for feedstock humidification (saturation). This happens at a higher pressure than the pressure in the water quench tower and the sour water stripper, usually about 2 to about 8 bara, in particular about 4 to about 6 bara, in order to feed it to the furnace section 1001, without needing a compressor. The feedstock humidification (saturation) is achieved in the saturator water heating circuit 151 using quench water as heating medium. The process water is collected in the bottom of the saturator 150 and returned to the top of the saturator via the saturator water heating circuit 151. The water is heated using a saturator water circuit heater on quench water 152. Fresh hydrocarbon feedstock 1 enters the bottom of the saturator and is saturated using suitable internals, typically using random packing, by the hot saturator water coming down the tower. By controlling the saturator water inlet temperature, the level of humidification can be controlled to reach the correct steam dilution level for the pyrolysis reactor. The steam diluted hydrocarbon feedstock is returned to the cracking furnace 1001, directly to the feed-effluent exchanger 90. A blow-down 26 from the saturator 150 and a make-up 25 to said saturator prevent accumulation of fouling contaminants in the saturator water heating circuit. As the quench water temperature level is limited to up to about 80° C., the hot saturator water inlet temperature is limited. The level of humidification depends on the hot saturator temperature and the partial pressure that the feedstock can generate in the tower. The lower the boiling point of the feedstock, the easier it is to reach a high humidification. Accordingly, the principle illustrated by FIG. 5 is in particular useful for an at least substantially gaseous feedstock for this embodiment, preferably a feedstock at least substantially consisting of ethane, propane or a mixture of ethane and propane. In FIG. 14, the dew point (° C., vertical axis) as function of absolute operating pressure (kg/cm$^2$, horizontal axis) in an exemplary saturator is illustrated, at a dilution steam (weight) ratio of 0.35. The rectangular box (grey) indicates the desired operating window for the system. A quenching water temperature of 80° C. is thus too low to use in combination with feedstock at ambient temperature to reach the steam dilution ratio of 0.35. Thus, at least without further measures, the scheme of FIG. 5 has its limitations in terms of applicable pressures and the dilution steam ratio (the dilution steam over hydrocarbon feedstock weight ratio). Possible measures include: a further heating of the quench water, the feedstock or both before entering the saturator; using a relatively low diluent to feedstock ratio; feeding the feedstock-diluent mixture to the pyrolysis reactor at a relatively low pressure.

The inventors found a number of ways which are particular suitable to address the limitations as discussed in the description regarding FIG. 5, as will be discussed next.

In a preferred embodiment, the ethylene plant according to the invention comprises a quench oil cooling system 51, configured to further cool pyrolysis reactor effluent (cracking product) and situated downstream of the feed-effluent heat exchanger 90. If present, it is usually employed in combination with a quench water cooling system 60 (or alternatively with an air cooler), wherein the quench oil cooling system is positioned upstream thereof. By making use of quench oil cooling system, equipped with a quench oil cooling circuit, the heat recovery level can be raised to a substantially higher level. This allows all the dilution steam to be generated in the saturator using waste heat from the effluent, also at a relatively high steam dilution ratio defined as dilution steam over hydrocarbon weight ratio, such as a steam dilution ratio of about 0.35 or more. This also reduces the cold utility requirements, such as the demand for air cooling, water cooling water or both. In accordance with the invention, the quench oil cooling system is advantageous for gaseous feedstocks (in particular in combination with the saturator/humidifier as described above, illustrated by FIG. 5), liquid feedstocks and combinations thereof. The quench oil cooling system 51 may be or be part of a primary fractionator system, which systems are known in the art, in particular in plants making use of liquid feedstocks.

Figure 6:
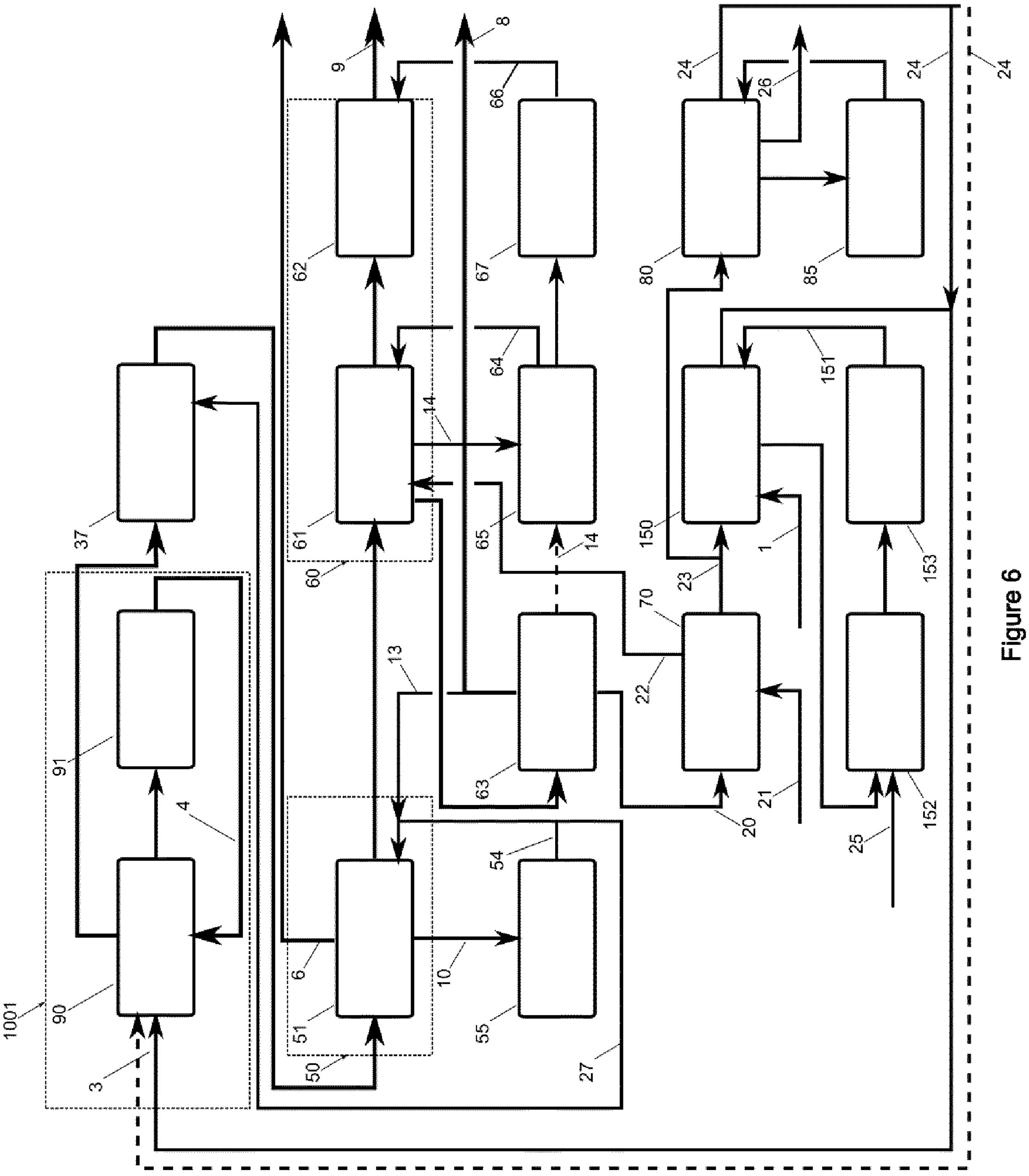
FIG. 6 schematically illustrates an ethylene plant/process in accordance with the invention.

A particular suitable ethylene plant respectively process of the invention overcoming a drawback of a scheme illustrated in FIG. 5, is illustrated in FIG. 6. This plant/process is particularly preferred for at least substantially gaseous feedstocks. In use, feed-effluent exchanger 90 and pyrolysis reactor 91 can be employed as described above.

From the furnace section 1001 the cooled effluent 4 is sent to the hot separation section of the plant, comprising the quench oil device 50 (typically comprising a primary fractionator 51 and a quench oil cooling circuit 55), water quench cooling system 60 (typically a water quench tower), a sour water stripper 70 and a humidifier (saturator) 150.

After leaving the feed-effluent heat exchanger 90, the cracking product 4 (pyrolysis reactor effluent) enters the hot separation section of the plant. Prior to entering the primary fractionator 50, the quench oil is usually combined with the cracking product; typically quench oil is injected in a so-called quench oil fitting prior to entering the primary fractionator. Injecting the quench oil upstream of the furnaces can advantageously be used to control the bottom temperature of the primary fractionator (tower). In the primary fractionator 50 the pyrolysis reactor effluent is further cooled, for example to about 110° C.-125° C. The temperature is advantageously reduced to a value close to yet generally above the dew point of water (which is typically at about 75° C.-80° C.) to ensure no water condenses in this device, e.g. to a temperature of 10 to about 50° C. above the dew point, preferably within in particular to a temperature of 20 to about 45° C. above the dew point, more in particular of 30° C. to about 40° C. above the dew point. The primary fractionator for cracking products that have been obtained from an essentially gaseous feedstock can be relatively simple compared to a primary fractionator that is used for liquid feedstock cracking. Generally, a quench oil wash section 51 (plus quench oil cooling circuit) suffices for cracking products obtained from essentially gaseous feedstock. In known olefin production plants, the primary fractionator usually additionally comprises at least a gasoline reflux section 53 and optionally a middle oil section 52 (not shown in FIG. 6). These are not required in accordance with the present invention, at least not when employing a primary fractionator for the treatment of a cracking product obtained from an essentially gaseous feedstock. The present invention (as illustrated in FIGS. 5 and 6) allows the dilution of (gaseous) feedstock without generating a separate dilution steam stream that is to be combined with the feedstock. Instead, by making use of a saturator/humidifier wherein water (i.e. in liquid form) is contacted with the feedstock to humidify the feedstock, the temperature level of the injection water at the top inlet of the saturator/humidifier is so low that the operating temperature in the bottom of the primary fractionator can be reduced below that of the dilution steam temperature level. The primary fractionator can be operated at 150° C. to be able to heat up the saturator circulation water to as high as 140° C. This is considerably lower than the operating temperature of the dilution steam drum, being around 165° C. and allows for a steam dilution ratio exceeding 0.35. Note that it is not a normal feature to have a primary fractionator for gaseous feedstock ethylene plants; in particular to the best of the inventors' knowledge, the use of a primary fractionator for gaseous feedstock ethylene plants in combination with the humidifier/saturator, purely required to reduce the supplied energy needs, is hitherto unknown in the art.

The pyrolysis reactor effluent (cracking product) is cooled by the quench oil. Advantageously the quench oil duty can be recovered from the pyrolysis reactor effluent. The quench oil cooling circuit 54 originates from the heavy fuel oil product 6 collected as a liquid product in the bottom of the primary fractionator. This quench oil 10 is cooled by the quench oil circuit coolers 55. This liquid product is normally cooled to around 80° C. This can also be cooled along with the quench oil by the quench oil circuit coolers 55 followed by additional cooling by another cooling medium available. If the flash point is too high for storage, a steam stripper can be added to flash of the light components. Details are not shown in the figure. In use, part of it is usually sent to the quench oil fitting 27 and the rest is usually re-injected into the top of the tower together with a minor quantity of gasoline reflux 13. Compared to the reflux in a conventional liquid cracker this flow rate is relatively small. It is in this case mainly the quench oil that performs the cooling and not the reflux. The minor quantity of reflux is there to be able to send back fuel components. In known olefin production plants it is common to use quench oil circuit coolers 55 to generate at least part of the dilution steam; however, advantageously the quench oil circuit is in accordance with the present invention instead (configured to be) used to heat up the saturator water circuit 151, when present. The quench oil cooling circuit is capable of serving the complete primary fractionator 50 in accordance with the invention. In addition to cooling the pyrolysis reactor effluent, heavy oil fractions are condensed in the primary fractionator. This heavy fuel oil 6 is the bottom product of the primary fractionator.

As described above (see in particular description of FIG. 5) in the water quench tower 60, the cracking product 4 is further cooled to approximately ambient conditions. The feedstock saturation is achieved in the saturator water heating circuit 151 using quench water as heating medium, e.g. as described above. The process water is collected in the bottom of the saturator 150 and returned to the top of the saturator via the saturator water heating circuit 151. The water is heated using a saturator water circuit heater on quench water 152. In addition to the plant/process comprising (the use of) a saturator/humidifier without the quench oil cooling system, the quench oil cooling system allows a further heating step: heating on quench oil. When the plant is configured for both water quenching and oil quenching, the quench water cooling circuit and the quench oil cooling circuit are generally arranged as follows: in use, the process water to be fed to the saturator is heated using a saturator water circuit heater on quench water 152, followed by a saturator water circuit heater on quench oil 153. An inlet for fresh (gaseous) feedstock 1 is provided in the saturator (typically at or near the bottom of a saturator tower). The saturator, provided with internals improving contact between the feedstock (typically moving upward) and saturator water, typically having a higher temperature than the feedstock and typically moving down the saturator. By controlling the saturator water inlet temperature, the level of humidification can be controlled to reach the correct steam dilution level for the pyrolysis reactor. The steam diluted hydrocarbon feedstock is returned to the cracking furnace 1001, directly to the feed-effluent exchanger 90.

In principle, this scheme is capable of providing the majority of the duty for reaching the required level of preheat and steam dilution of the feedstock during normal operation (such as steady state operation). Enough waste heat is available in the effluent to saturate the feedstock close to the requirement and the quench oil is hot enough to provide the necessary temperature level. However, for some operations dilution steam is required. These are the start-up situation, the decoke operation and the hot standby operation. In these cases, no feedstock is sent to individual furnaces, for example a furnace in decoke operation. For this reason, a dilution steam drum 80 with an electric boiler 85 is preferably provided in the flow scheme to provide dilution steam 24. In addition, dilution steam can be used to supply a required amount of sour water striping steam and instrument purge steam. The capacity of this system can be limited compared to a known plant wherein dilution steam is needed during normal operation. In addition, stripping steam can be used to supply a requirement for the sour water stripper. During normal operation a quantity of dilution steam can be mixed with the steam diluted feedstock coming from the saturator to provide a small amount of superheat, if desired. Advantageously the contribution of the dilution steam drum 80 with an electric boiler 85 to the total dilution steam demand is preferably less than 40%, more preferably less than 30% and even more preferably less than 20%. For start-up, decoke, hot standby and back-up operation dilution steam can be sent to the furnace separately.

A blow-down 26 from the dilution steam drum 80 and a make-up 25 to said saturator water heating circuit prevent accumulation of fouling contaminants in the saturator water and dilution steam generation circuits. Thus, these are preferably present.

Figure 7:
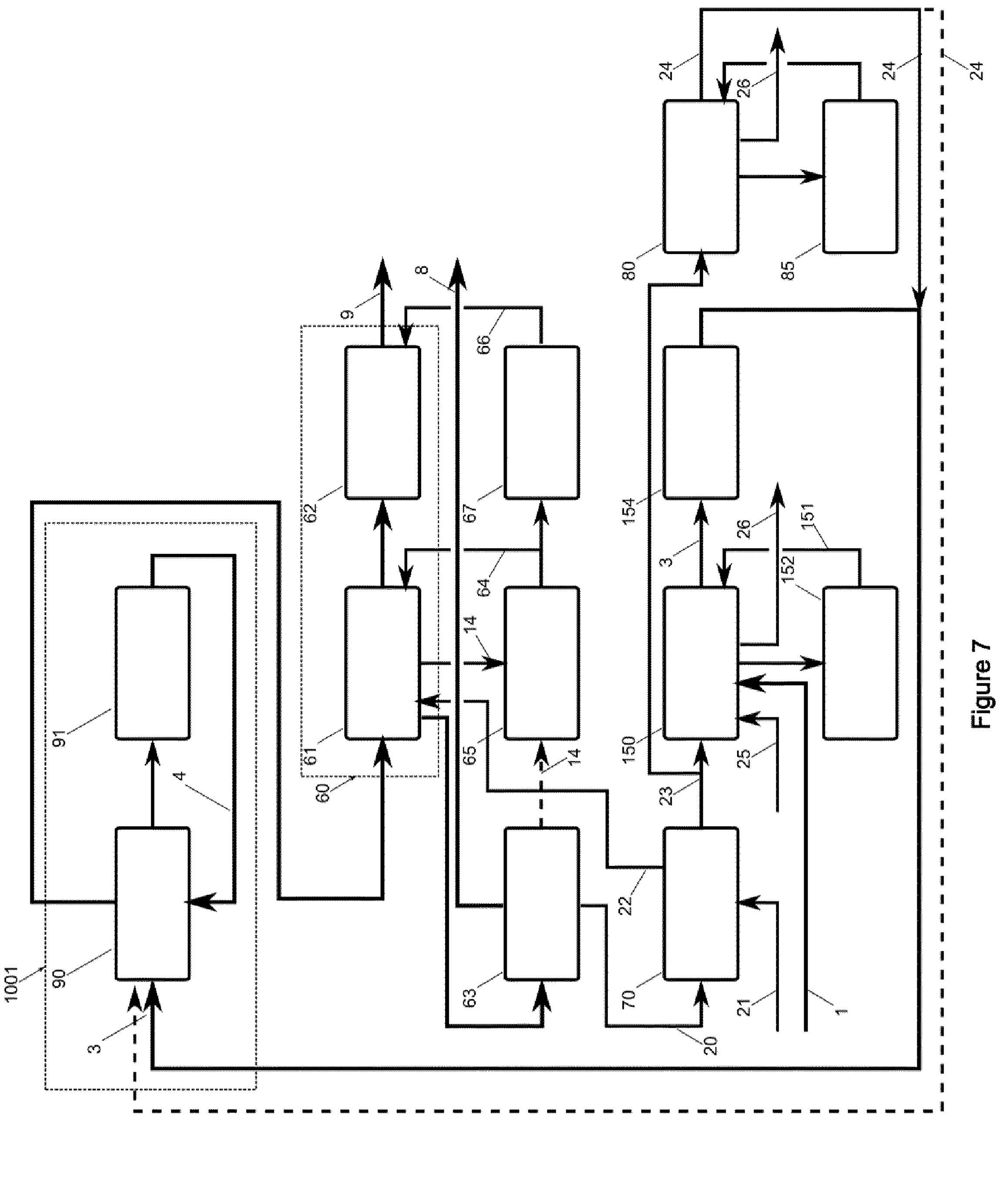
FIG. 7 schematically illustrates an ethylene plant/process in accordance with the invention.

As an alternative to the use of heat from a quench oil cooling device (as illustrated by the embodiment of FIG. 6) or in combination therewith, the limitations to the use of a saturator, as discussed in the description regarding FIG. 5, in particular with respect to a maximum feasible dilution steam to feedstock ratio, the inventors realised it is possible to reach a higher amount of saturation of the (essentially gaseous) feedstock with water (vapor) when humidifying the feedstock in the saturator 150 at about atmospheric pressure or a relatively low pressure above atmospheric pressure, i.e. at a pressure below the pressure at which the pyrolysis reactor is configured to be operated, and thereafter compressing the humidified feedstock (i.e. feedstock-diluent mixture) prior to feeding it to the cracking section. An ethylene plant/process according to the invention, comprising (the use of) a compressor for compressing the humidified feedstock is schematically shown in FIG. 7.

The scheme can be basically the same as that of FIG. 5. However, the plant further includes a compressor 154 downstream of the saturator/humidifier 150, which saturator/humidifier is configured to operate typically at about atmospheric pressure. In use, the feedstock is humidified, in particular essentially saturated, at a pressure below the pressure at which the electrically-powered cracking furnace 1001 is configured to be operated. Usually a conventional radiant coil type pyrolysis reactor is operated at a pressure in the range of 1.5-4.0 bara, in particular 1.7-3.0 bara. Other designs like the rotodynamic device of a Coolbrook may require a lower pressure. Potentially as low as about 2 bara, typically about 4 bara. The humidified gas is compressed to the correct pressure, typically in the range of 2.0-6, in particular 2.5-4 bara, using saturated gaseous feedstock compressor 154 to supply the humidified feedstock 3 to the furnace section 1001. Contrary to the scheme of FIG. 6—that typically allows operation without requiring any additional (electric) power for providing the required level of preheat and steam dilution of the feedstock. This option requires electric power to drive the compressor, but compared to generating dilution steam using an electric boiler, this option still requires 40-50% less power, depending on the applied supply pressure for the furnace. Further, the combination of a humidifier at a relatively low pressure plus a compressor for compressing the hydrocarbon feedstock diluent mixture, allows the hydrocarbon feedstock diluent mixture at a desirably high dilution steam ratio such as a ratio of about 0.35. Similar as in the scheme of FIG. 6, a dilution steam drum 80 with an electric boiler 85 is advantageously present to supply dilution steam 24.

Figure 8:
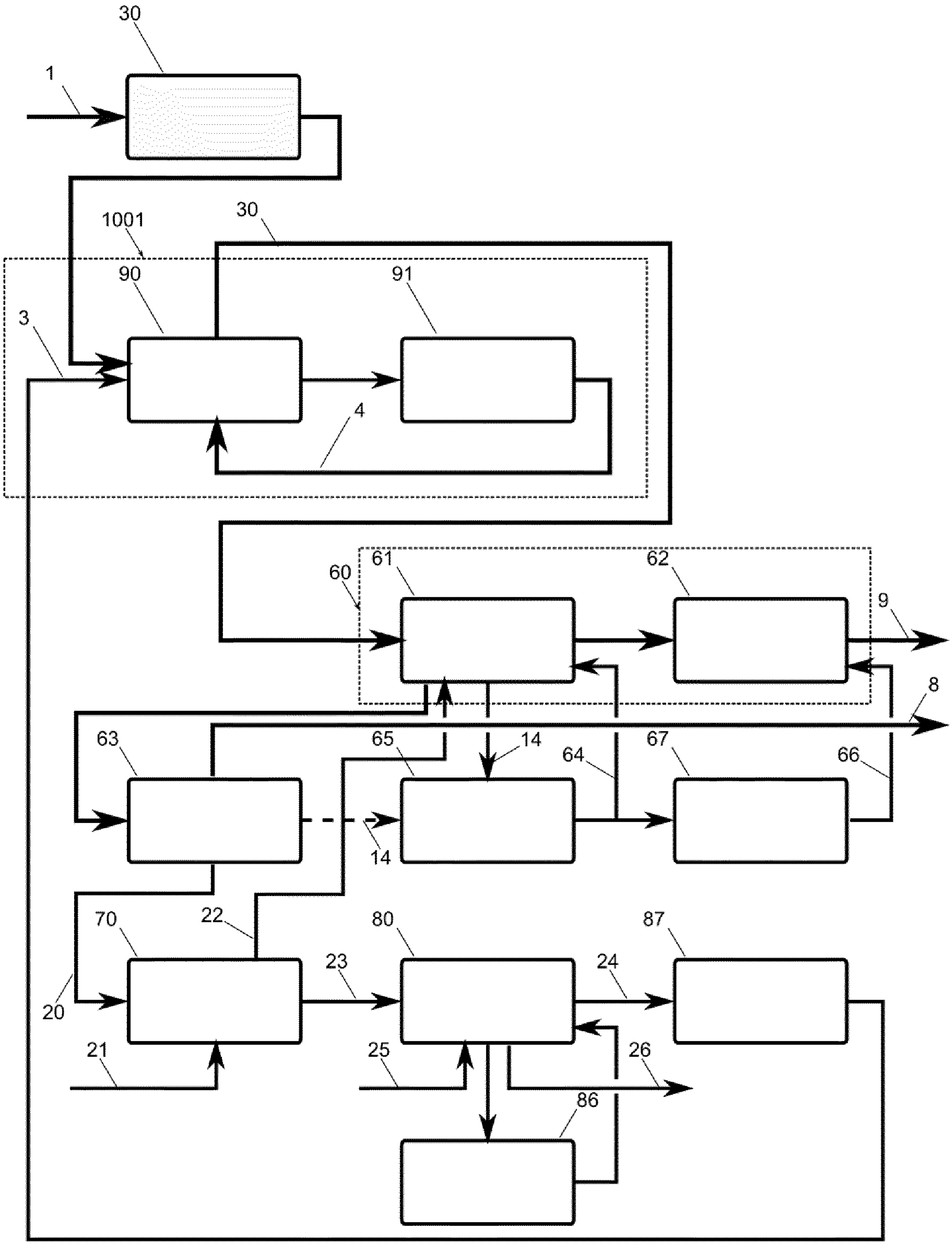
FIG. 8 schematically illustrates an ethylene plant/process in accordance with the invention.

In yet a further embodiment, not only particularly suitable for cracking essentially gaseous feedstocks by steam cracking but also for cracking liquid feedstocks or mixtures of gas and liquid feedstocks, the ethylene plant comprises a dilution steam generator, and comprises in addition a heat pump configured to generate the dilution steam. FIG. 8 schematically shows an advantageous plant/process according to the invention applying the heat pump and refrigerant. The refrigerant generally has a normal boiling point in a range between 0° C. and 80° C. Although this range can be preferred for practical reasons, it will be understood that refrigerants having a boiling point outside may be used. The flow scheme of FIG. 8 can be largely the same as the one for FIG. 5, except that a dilution steam generator is present, configured to make use of condensing refrigerant 86 and a dilution steam superheater 87 is present using refrigerant instead of a saturator/humidifier. In use, the refrigerant duty for generating the dilution steam is made available by using a heat pump to elevate the quench water duty to a higher level. The details of a particularly suitable heat pump are presented in FIG. 9. Subcooled medium pressure refrigerant liquid 190 from medium pressure refrigerant drum 173 is let down by the liquid refrigerant depressurization valve to low pressure 181 producing a flashing low pressure refrigerant 191. This refrigerant is separated in the low pressure refrigerant drum 170. The liquid fraction is recirculated by natural circulation over a thermosyphon type reboiler, the low pressure refrigerant vaporizer 171, to be evaporated using lower level quench water duty from the quench water circuit. Alternatively, the low pressure refrigerant drum 170 and the low pressure refrigerant vaporizer 171 can also be combined in a kettle type reboiler as the refrigerant is a clean fluid. Low pressure saturated refrigerant vapor 192 is compressed to medium pressure slightly superheated refrigerant vapor **195*a* in the low to medium pressure refrigerant compressor 172**.

Subcooled high pressure refrigerant liquid 193 from refrigerant economizer 175 is let down by the liquid refrigerant depressurization valve to medium pressure 180 producing a flashing medium pressure refrigerant 194. This refrigerant is separated in the medium pressure refrigerant drum 173. The liquid fraction is recirculated by natural circulation over a thermosyphon type reboiler, the medium pressure refrigerant vaporizer 174, to be evaporated using higher level quench water duty from the quench water circuit. Alternatively, the medium pressure refrigerant drum 173 and the medium pressure refrigerant vaporizer 174 can also be combined in a kettle type reboiler as the refrigerant is a clean fluid. Medium pressure saturated refrigerant vapor **195*b* is combined with medium pressure slightly superheated refrigerant vapor 195*a* and superheated in refrigerant economizer 175 to medium pressure superheated refrigerant vapor 196. After being compressed in the medium to high pressure refrigerant compressor 176 to a temperature level exceeding that of the dilution steam generation, the refrigerant is de-superheated by saturated dilution steam in the high pressure refrigerant desuperheater 177. The high pressure de-superheated refrigerant vapor 198 is condensed by process water from the dilution steam drum in the high pressure refrigerant condenser 178. The condensed high pressure refrigerant liquid 199 is subcooled in the refrigerant economizer 175. The subcooled high pressure refrigerant liquid 193** is recycled.

With this scheme it is possible to upgrade excess heat available in the quench water circuit to a temperature level high enough to generate dilution steam. The low pressure refrigerant serves a lower temperature level quench water, while the medium pressure serves a higher temperature level quench water. A third pressure level can be introduced to recover the quench water duty in three levels instead of two. The refrigerant pressures and the refrigerant itself are selected such that quench water duty can be recovered by evaporation liquid refrigerant at various temperature levels matching the quench water circuit coolers and that the refrigerant vapor can be condensed at a suitable temperature level for dilution steam generation.

The use of an ethylene plant comprising a heat pump system for the generation of dilution steam requires electric power in addition to the electric power for the pyrolysis reactor. However, the power requirement, compared to generating dilution steam using an electric boiler, is typically up to about 50-70% less, depending on the used supply pressure for the furnace. This is similar to that of a plant making use of humidifier plus compressor for humidified feedstock (see e.g. FIG. 7). An advantage of the use of a heat pump, e.g. as illustrated by FIG. 8, over that making use of a saturator as illustrated in FIG. 6 or 7 is that the heat pump system can also take over the role of an electric boiler outside normal operation (such as during start-up). Further, it is envisaged that an embodiment making use of the heat pump is particularly advantageous, compared to a plant/process making use of a saturator for high steam to hydrocarbon feedstock ratio's, such as a ratio of more than 0.35.

For the cracking of an at least substantially liquid feedstock or a mixture of liquid and gaseous feedstock it is in particular preferred to make use of a system configured to heat up the feedstock and evaporate it by heat recovered from quench water and quench oil respectively. Further, heat recovered from the middle oil is preferably used. Dilution steam is advantageously generated from heat pumped quench water duty, such as described above, preferably using a refrigerant scheme as described when discussing FIG. 9. An advantage of an ethylene plant or process of the invention comprising these measures is that feedstock can be evaporated without the help of flue gas and that the dilution steam can be evaporated without the use of MP steam. By using the heat pump to generate the MP steam, power can be reduced in excess of 50% compared by using an electric MP boiler for this service. This reduces the additional electrical power requirement to a large extent. Such advantageous process is further illustrated in FIG. 10. Generally, as illustrated in FIG. 10, in use, the feedstock 2, preferably a liquid feedstock, such as liquefied butane, pentane or naphtha or a mixture thereof is first preheated in a preheater 30 with a low-temperature heat source such as the quench water external to the furnace 1001 to heat it up from ambient condition to a temperature close to the hottest temperature of the low-temperature heat source, such as the hottest temperature in the quench water circuit, typically to a temperature within 5-10° C. of the hottest temperature. For a hottest quench water temperature of about 75-80° C. it is possible to preheat up to 70-75° C.

Further preheat and partial evaporation of the feedstock is achieved by middle oil in hydrocarbon feedstock preheater by middle oil 43 and hydrocarbon partial feedstock evaporator by middle oil 44 external to the furnace. Partially evaporated feedstock is separated in the hydrocarbon feedstock drum 45. The liquid fraction is recirculated by natural circulation over a thermosyphon type reboiler, the hydrocarbon feedstock evaporator by quench oil vaporizer 46, to be evaporated using quench oil duty from the quench oil circuit. Fully evaporated feedstock is sent to the feed-effluent exchanger 90 of electrically-powered cracking furnace 1001. Provided that the quench oil duty is available and the temperature level is high enough the feedstock can be slightly be superheated by quench oil as well in hydrocarbon feedstock superheater by quench oil 47.

To suppress the hydrocarbon partial pressure in the pyrolysis reactor, which is beneficial for the product yield and for suppressing coke formation, the superheated dilution steam 24 (typically superheated by 30-50° C., depending on the refrigerant compressor efficiency) coming from the hot separation section is also sent to the feed-effluent exchanger 90 prior to being fed to the electrically-powered pyrolysis reactor 91 in the cracking furnace section 1001.

A mixture of hydrocarbon feedstock and dilution steam 3 enters the feed-effluent exchanger 90 above the water dewpoint and is heated up with waste heat from the effluent by means of the feed-effluent exchanger 90 to a suitable inlet temperature for the electrically-powered pyrolysis reactor 91. Said pyrolysis reactor 91 supplies the sensible heat and the heat of reaction to the steam diluted hydrocarbon feedstock 3 for the conversion of feedstock to products. The waste heat from the reactor effluent 4 is recovered by means of the feed-effluent exchanger 90.

Next, the effluent is cooled in a quench oil fitting 37 using a quench oil injection 27 and a middle oil injection 28, if the middle oil loop is available. From the furnace section the effluent 4 is sent to the hot separation section of the plant, mainly consisting of the primary fractionator 50, the water quench tower 60, the sour water stripper 70 and the dilution steam drum 80.

In the primary fractionator 50 the pyrolysis reactor effluent (cracking product) is further cooled, maintaining a temperature above the dew point of water, preferably at 5° C. above the dew point, more preferably 5° C.-40° C., above the dew point to ensure no water condenses in this tower. For example for a dew point of about 90° C., an operating temperature can be controlled within a range from 95-110° C., e.g. to approximately 100° C., by controlling the injection of reflux. The effluent is subsequently cooled using the quench oil and the middle oil pump-arounds and the gasoline reflux respectively. The quench oil cooling circuit 54 originates from the heavy fuel oil product 6 collected in the bottom of the tower. This quench oil 10 is cooled by the quench oil circuit coolers 55. Part of it is sent to the quench oil fitting 27 and the rest is re-injected into the tower below the middle oil total draw off tray. The quench oil circuit coolers 55 are used in this case to evaporate the feedstock in the hydrocarbon feedstock evaporator by quench oil vaporizer 46. The primary fractionator bottom temperature can be adjusted to such a temperature level to make this feasible. The skilled person will be able to do this based on common general knowledge and the contents of the present disclosure, for example by controlling the amount of quench oil injected into the quench oil fitting. The quench oil cooling circuit serves the primary fractionator wash section 51, the column's bottom section.

The middle oil cooling circuit 56 is preferably present. It provides a relatively clean/non-fouling intermediate cooling circuit that is recovering lower level heat from the effluent than the quench oil circuit 54. The middle oil 11 is collected on a draw off tray in the bottom of the primary fractionator middle oil section 52, located above the wash section 51 in the tower. A middle oil reflux 12 is sent to the quench oil wash section 51 in the bottom of the tower, to be able to shift quench oil duty to the middle oil loop. In addition, a middle oil stream is sent to the quench oil fitting 28. The rest is cooled by the middle oil circuit coolers 57 and returned to the tower below the light fuel oil draw of point. The middle oil cooling circuit 56 serves the primary fractionator middle oil section 52. In this case the middle oil can be used to preheat and partially evaporate the hydrocarbon feedstock in in hydrocarbon feedstock preheater by middle oil 43 and hydrocarbon partial feedstock evaporator by middle oil 44. Optionally the quench oil can be used for this purpose.

The gasoline reflux 13 coming from the gasoline/water separator 63 is handling the recovery of the heat in the top of the tower, the primary fractionator gasoline reflux section 53, and shifts the recovered duty to the quench water circuit. Suitable internals are installed in the tower to efficiently transfer heat from the effluent to the injected quench oil, middle oil and gasoline reflux. In addition to cooling the effluent, light oil and heavy oil fractions are condensed in the primary fractionator. The heavy fuel oil 6 is collected in the bottom section 51, while the light fuel oil 7 is collected in the bottom of the reflux section 53 on the light oil partial draw-off tray. These products can be stripped to control the flash point of the total fuel oil product 5 and/or to recover lighter quench oil fractions for viscosity control of the quench oil circuit. In addition, they can be cooled as well. These details are not shown as for this application they are irrelevant.

In the water quench tower 60, the effluent 4 is further cooled to approximately ambient conditions. This is done using a pump around circuit, that collects the accumulated water bottom product, the so-called quench water 14, and injects it at various levels in the quench tower 60. The quench water circuit usually has two stages, the quench water bottom cooling circuit 64, serving the quench water tower bottom section 61 and the quench water top cooling circuit 66, serving the quench water tower top section 62. The quench water bottom circuit coolers 65 are typically process users to recover as much of the quench water duty as possible. Such users are for instance the feedstock preheater 30 and/or the propylene splitter reboiler (not shown). In this case the duty is used for feed preheat using feedstock preheater 30 and for refrigerant evaporation using the medium pressure refrigerant vaporizer 174 and/or the low pressure refrigerant vaporizer 171 of the refrigerant circuit of FIG. 9. Any excess heat usually has to be removed by air cooling or cooling water cooling. The refrigerant loop reduces these cold utilities and transfers quench water duty to a level suitable to generate dilution steam. The cooled injected water from the pump around circuit is used within the quench water tower to remove the heat from the cracked gas by direct heat exchange over suitable tower internals. The main duty of this tower, apart from cooling the cracked gas, is the condensation and recovery of the dilution steam. The condensed dilution steam is the nett product from the tower's bottom, in addition to a small stream of gasoline product. These are usually separated from each other using an gasoline/water separator 63. Sometimes this separator also collects the quench water for the quench water circuit. This condensed dilution steam, called sour water 20, contains sour gases, which are stripped of by strip steam 21 in the sour water stripper 70. These sour gases 22 are returned to the quench water tower 60. The stripped water, called process water 23 is suitable for dilution steam generation. This happens at a higher pressure than in the quench water tower and the sour water stripper, usually about 2 to about 7 bara, in particular about 4 to about 6 bara, in order to feed it to the furnace section 1001. The dilution steam generation is achieved using refrigerant. The process water is collected in the dilution steam drum 80 and via a thermosyphon circuit dilution steam 24 is generated from the condensing refrigerant in the dilution steam generator using condensing refrigerant 86. Any superheat in the refrigerant is used to mildly superheat the dilution steam in the dilution steam superheater 87 to a temperature of 180° C. thru 210° C. before returning it to the electrically-powered cracking furnace 1001 to dilute the hydrocarbon feedstock 1. A blow-down 26 from the dilution steam drum 80 and a dilution steam system make-up 25 to said drum prevent accumulation of fouling contaminants in the dilution steam generation circuit.

Figure 10:
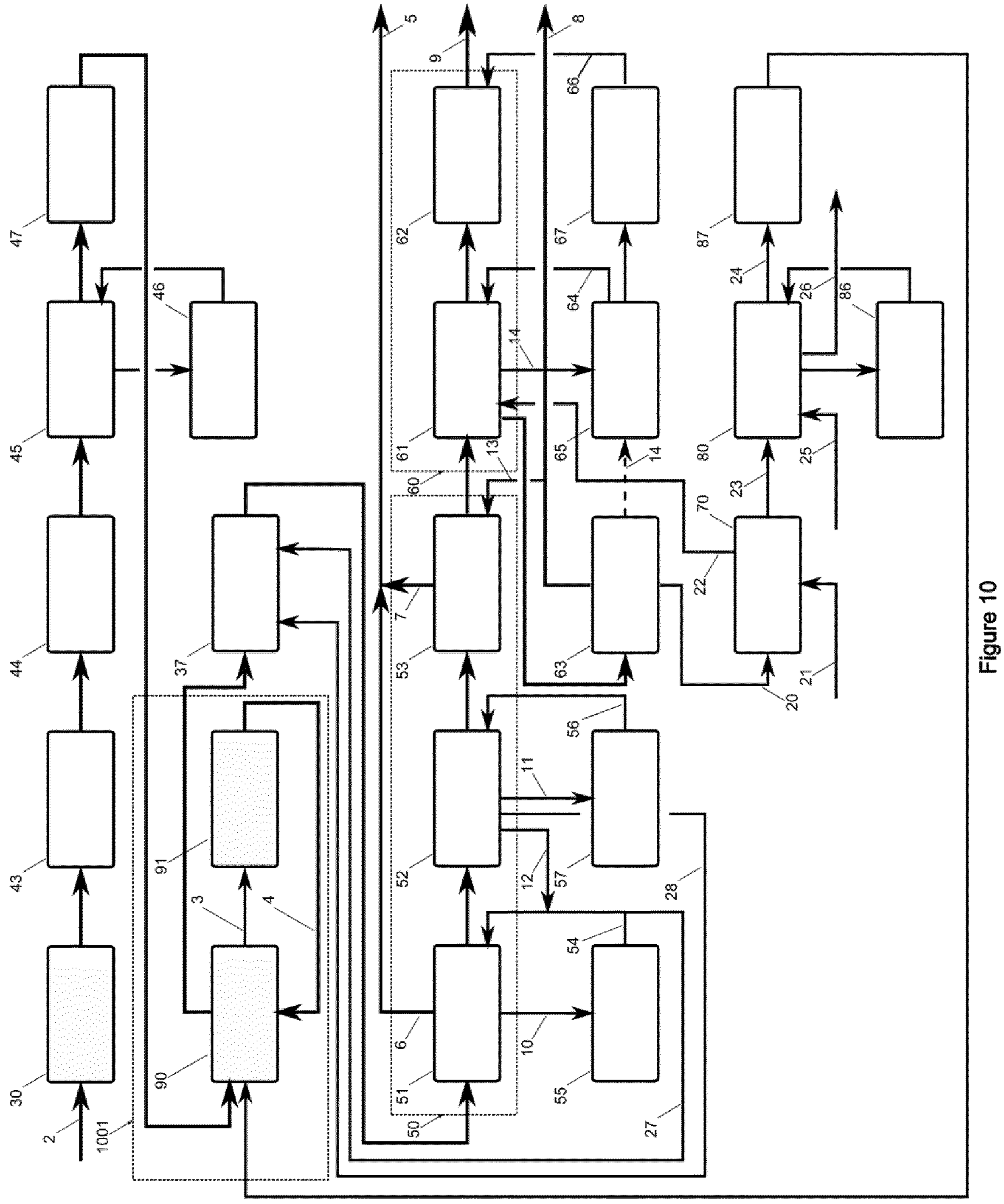
FIG. 10 schematically illustrates an ethylene plant/process in accordance with the invention.
Figure 11:
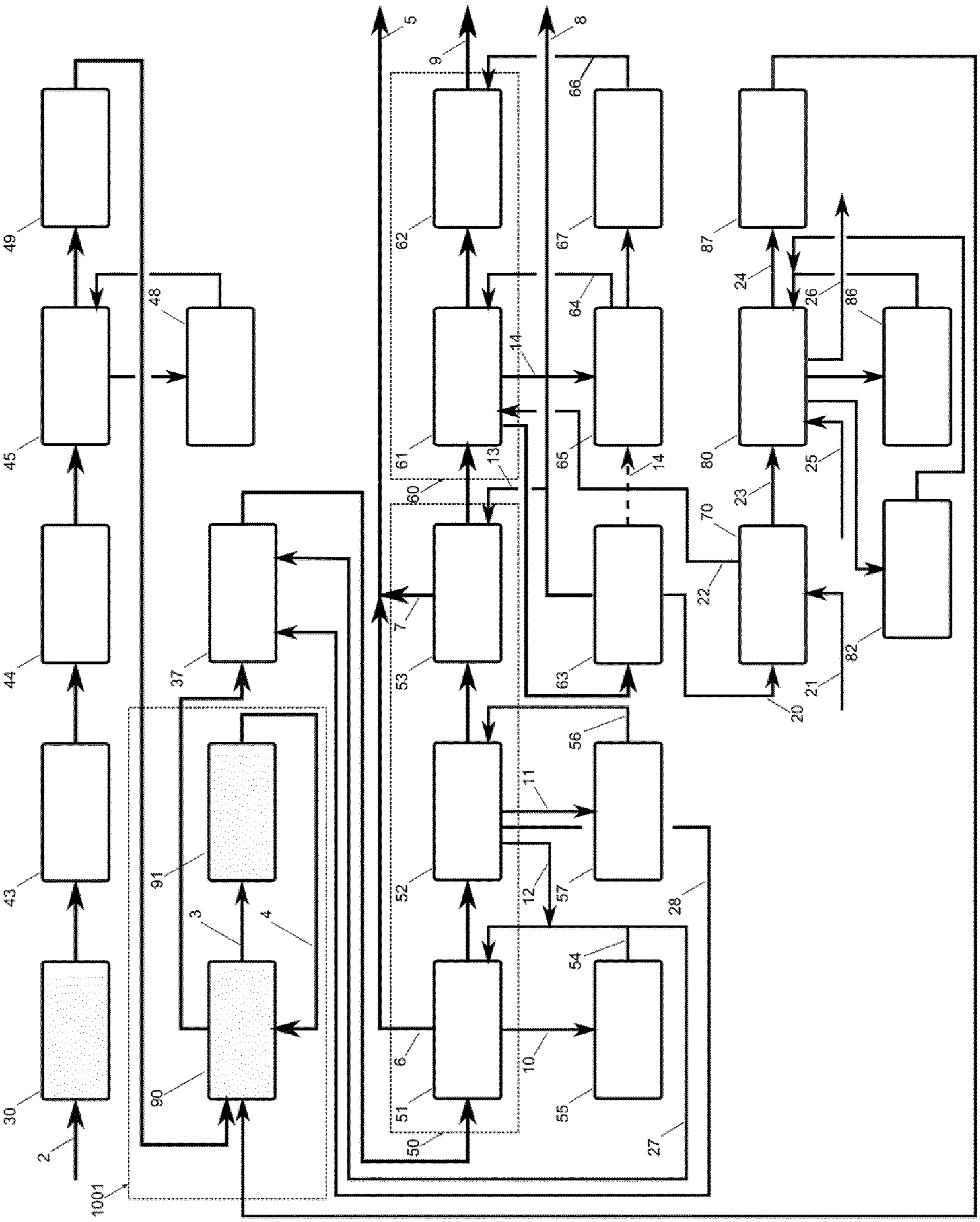
FIG. 11 schematically illustrates an ethylene plant/process in accordance with the invention.

An alternative plant/process according to the invention is based on a heat integration scheme shown in FIG. 11. This scheme is similar to the scheme of FIG. 10, except for the heat integration. It is also particularly useful for the cracking of liquid feedstocks and mixtures of liquid and gaseous feedstock.

In a process or plant according to the invention based on the scheme of FIG. 11, the quench oil duty is not (configured to be) used for feedstock evaporation, but for dilution steam generation with dilution steam generator using quench oil 82. In use, the feedstock evaporation is in this case performed by refrigerant in hydrocarbon feedstock evaporator by condensing refrigerant 48 and the superheating by hydrocarbon feedstock superheater by refrigerant 49.

The performance of a process or plant based on FIG. 10 or FIG. 11 is very similar for these two schemes. For the scheme of FIG. 11 the refrigeration circuit needs to be adjusted to also supply heat to the feedstock evaporator 49. Depending on the feedstock this can be at a higher or a lower temperature level than that of the dilution steam generation. A separate compressor can be installed to do this duty or two compressors can be put in series.

Figure 12:
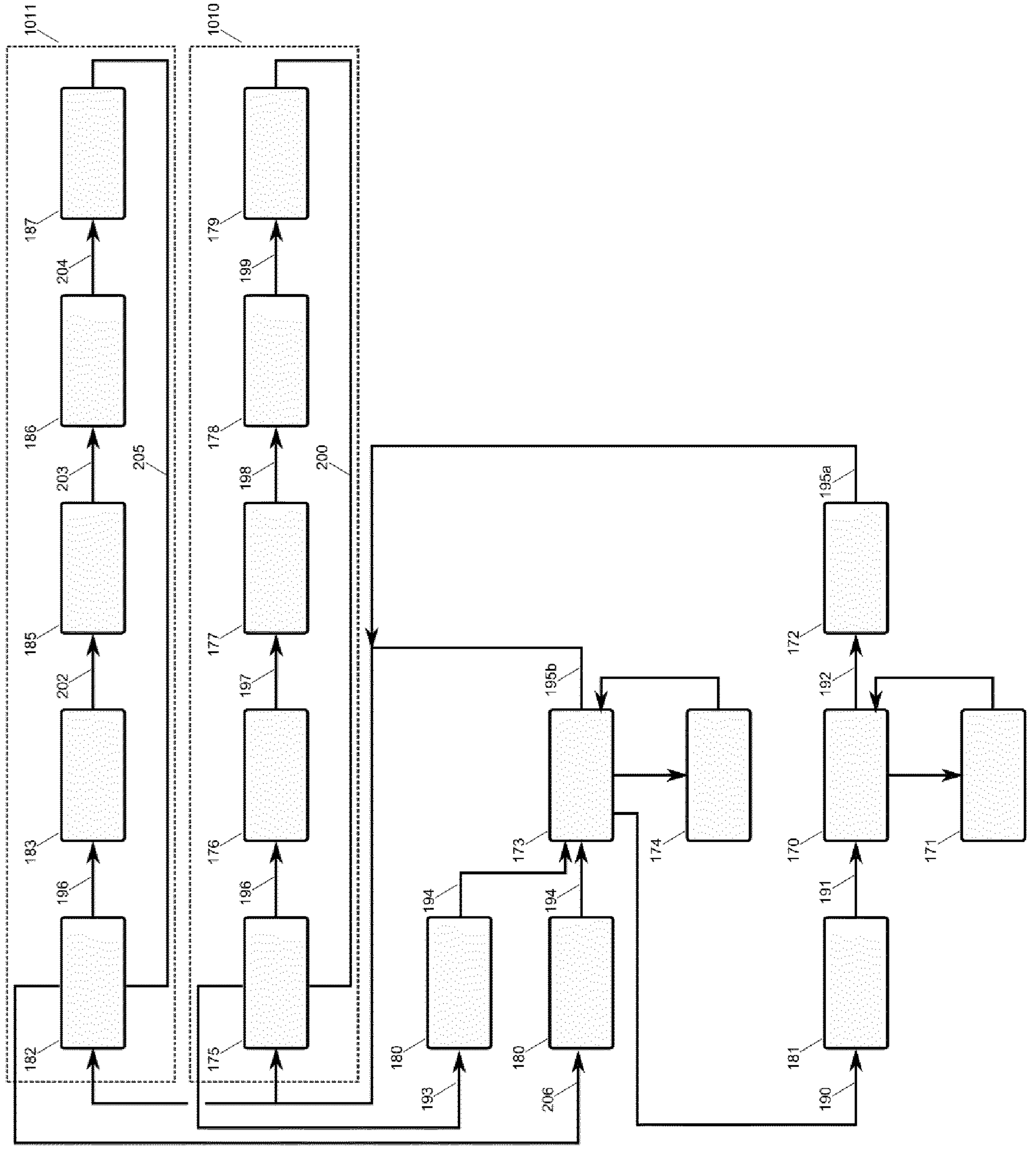
FIG. 12 schematically illustrates aspects relating to refrigeration for an ethylene plant/process in accordance with the invention.
Figure 13:
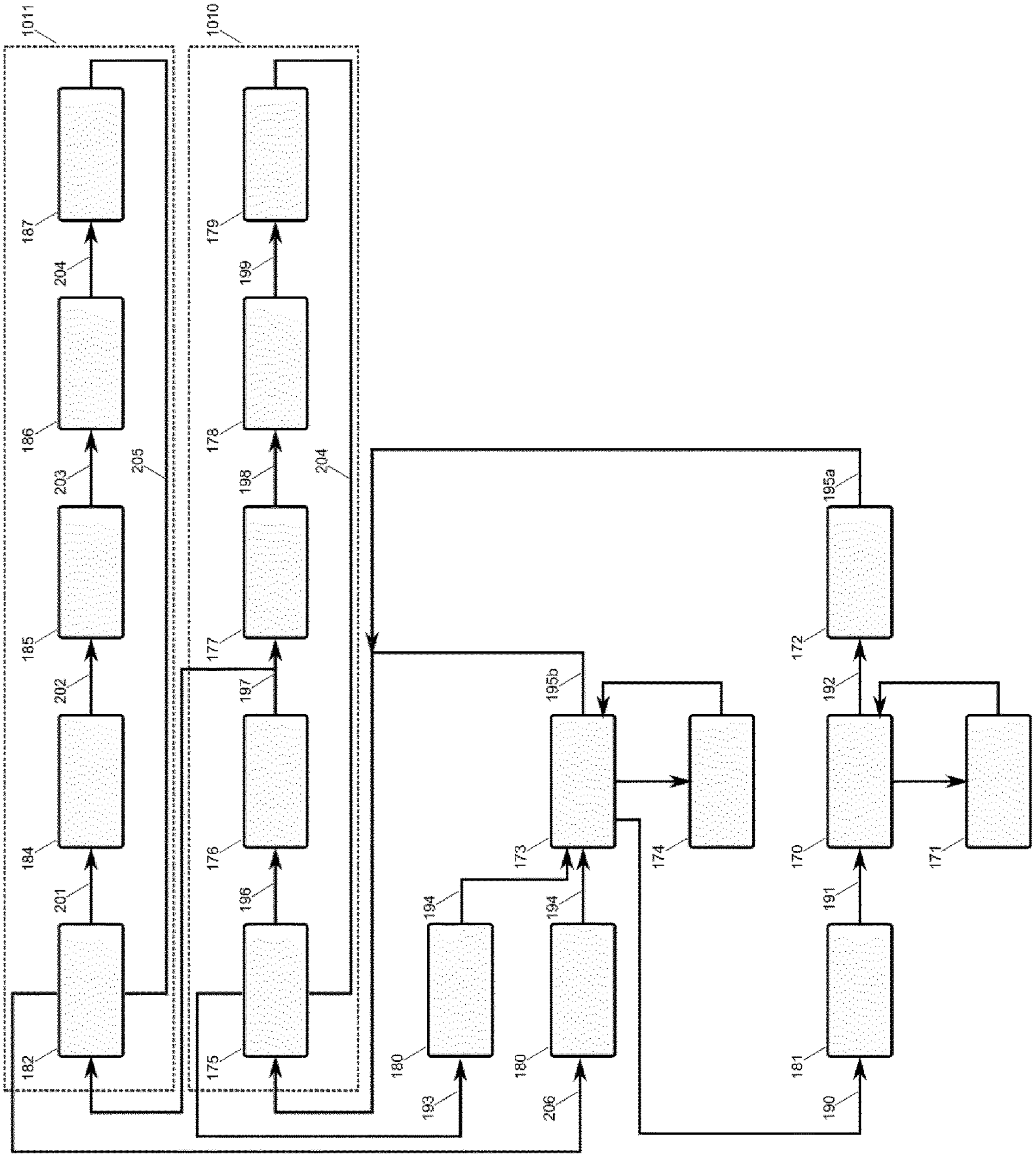
FIG. 13 schematically illustrates aspects relating to refrigeration for an ethylene plant/process in accordance with the invention.

FIG. 12 and FIG. 13 show refrigeration compressor systems which can be employed in a process or plant according to the invention. These refrigeration compressors can be installed on a single shaft and also in a single casing, if required. The refrigeration compressor system can be used for a further reduction of the requirement for electric power.

FIG. 12 shows two separate high pressure loops in parallel, a high pressure refrigeration circuit branch 1010 and a high-high pressure refrigeration circuit branch 1011. Each of these two branches is operated at a different pressure and corresponding operating temperatures, such as to best match the temperature levels of the dilution steam generation and feedstock evaporation. This will result in the lowest requirement for electric power. One branch is handling the feedstock evaporation via hydrocarbon feedstock evaporator by condensing refrigerant 48 and the other branch is handling the dilution steam generation via dilution steam generator using condensing refrigerant 86. If the operating temperature of the hydrocarbon feedstock evaporator is higher than that of the dilution steam generator, the hydrocarbon feedstock evaporator will be operated by the high-high pressure branch 1011 and the dilution steam generator by the high pressure branch 1010. If the operating temperature of the hydrocarbon feedstock evaporator is lower than that of the dilution steam generator, the hydrocarbon feedstock evaporator will be operated by the high pressure branch 1010 and the dilution steam generator by the high pressure branch 1011.

Subcooled medium pressure refrigerant liquid 190 from medium pressure refrigerant drum 174 is let down by the liquid refrigerant depressurization valve to low pressure 181 producing a flashing low pressure refrigerant 191. This refrigerant is separated in the low pressure refrigerant drum 170. The liquid fraction can be recirculated by natural circulation over a thermosyphon type reboiler, the low pressure refrigerant vaporizer 171, to be evaporated using lower level quench water duty from the quench water circuit. Alternatively, the low pressure refrigerant drum 170 and the low pressure refrigerant vaporizer 171 can be combined in a kettle type reboiler as the refrigerant is a clean fluid. Low pressure saturated refrigerant vapor 192 is compressed to medium pressure slightly superheated refrigerant vapor 195*a* in the low to medium pressure refrigerant compressor 172.

Subcooled high-high pressure refrigerant liquid 206 from high-high pressure refrigerant economizer 182 and subcooled high pressure refrigerant liquid 193 from high pressure refrigerant economizer 175 are let down by the liquid refrigerant depressurization valves to medium pressure 180 producing a flashing medium pressure refrigerant 194. This refrigerant is separated in the medium pressure refrigerant drum 173. The liquid fraction can be recirculated by natural circulation over a thermosyphon type reboiler, the medium pressure refrigerant vaporizer 174, to be evaporated using higher level quench water duty from the quench water circuit. Alternatively, the medium pressure refrigerant drum 173 and the medium pressure refrigerant vaporizer 174 can also be combined in a kettle type reboiler as the refrigerant is a clean fluid. Medium pressure saturated refrigerant vapor 195*b* is combined with medium pressure slightly superheated refrigerant vapor 195*a*.

At this point the combined streams 195*a* and 195*b* are sent to two parallel refrigeration circuit branches 1010 and 1011.

The part sent to the high pressure branch 1010 is superheated in high pressure refrigerant economizer 175 to medium pressure superheated refrigerant vapor 196. After being compressed in the low to medium to high pressure refrigerant compressor 176 to a temperature level exceeding that of the dilution steam generation or hydrocarbon feedstock evaporation, whichever of the two is lower in temperature level. The refrigerant is desuperheated by saturated dilution steam or by hydrocarbon feedstock in the high pressure refrigerant desuperheater 177 using dilution steam superheater using refrigerant 87 or hydrocarbon feedstock superheater by refrigerant 49, respectively. The high pressure desuperheated refrigerant vapor 198 is condensed by process water from the dilution steam drum or hydrocarbon feedstock in the high pressure refrigerant condenser 178 using dilution steam generator using condensing refrigerant 86 or hydrocarbon feedstock evaporator by condensing refrigerant 48, respectively. The condensed high pressure refrigerant liquid 199 is subcooled in the high pressure refrigerant economizer 175. The subcooled high pressure refrigerant liquid 193 is recycled.

The part sent to the high-high pressure branch 1011 is superheated in high-high pressure refrigerant economizer 182 to medium pressure superheated refrigerant vapor 196. After being compressed in the medium to high-high pressure refrigerant compressor 183 to a temperature level exceeding that of the dilution steam generation or hydrocarbon feedstock evaporation, whichever of the two is higher in temperature level. The refrigerant is desuperheated by saturated dilution steam or by hydrocarbon feedstock in the high-high pressure refrigerant desuperheater 185 using dilution steam superheater using refrigerant 87 or hydrocarbon feedstock superheater by refrigerant 49, respectively. The high-high pressure desuperheated refrigerant vapor 186 is condensed by process water from the dilution steam drum or hydrocarbon feedstock in the high-high pressure refrigerant condenser 187 using dilution steam generator using condensing refrigerant 86 or hydrocarbon feedstock evaporator by condensing refrigerant 48, respectively. The condensed high-high pressure refrigerant liquid 205 is subcooled in the high-high pressure refrigerant economizer 182. The subcooled high-high pressure refrigerant liquid 206 is recycled.

With this scheme it is possible to upgrade excess heat available in the quench water circuit to a temperature level high enough to generate dilution steam and evaporate hydrocarbon feedstock in two separate branches of the refrigeration system.

FIG. 13 scheme is similar to that of FIG. 12, except that the split between the two branches is downstream of the medium to high pressure compressor 176 and that the medium to high-high pressure compressor 183 is replaced by the high to high-high pressure compressor 183, such that the compressors in branches 1010 and 1011 are in series instead of in parallel.

As used herein, the singular forms "a", "an" and "the" are intended to include the plural forms as well—, e.g. "a cracking furnace" includes "cracking furnaces"; "a burner" includes "a plurality of burners", etc., unless the context clearly indicates otherwise. The term "or" includes any and all combinations of one or more of the associated listed items, unless the context clearly indicates otherwise (e.g. if an "either . . . or" construction is used). It will be understood that the terms "comprises" and "comprising" specify the presence of stated features but do not preclude the presence or addition of one or more other features. It will be further understood that when a particular step of a method is referred to as subsequent to another step, it can directly follow said other step or one or more intermediate steps may be carried out before carrying out the particular step, unless specified otherwise. Likewise, it will be understood that when a connection between structures or components is described, this connection may be established directly or through intermediate structures or components unless specified otherwise.

In the context of this application, the term "about" includes in particular a deviation of 10% or less from the given value, more in particular 5%, more in particular 3% or less.

The term "(at least) substantial(ly)" or "(at least) essential (ly)" is generally used herein to indicate that it has the general character or function of that which is specified. When referring to a quantifiable feature, this term is in particular used to indicate that it is at least 75%, more in particular 90% or more, even more in particular 95% or more of the maximum of that feature. The term 'essentially free' is generally used herein to indicate that a substance is not present (below the detection limit achievable with analytical technology as available on the effective filing date) or present in such a low amount that it does not significantly affect the property of the product that is essentially free of said substance.

The term "high pressure steam" (HP steam) is well known in the art. As a rule of thumb, the pressure of HP steam is usually at least about 40 barg, e.g. 80 barg or more, e.g. about 100 barg to about 130 barg, such as 100-125 barg.

The term "middle pressure steam" (MP steam) relates to steam having an upper pressure limit of 40 barg. As used herein the term MP is usually in a range of about 6-about 20 bara, more particularly in a range of 7-13 bara.

The term "low pressure steam" relates to steam having a pressure below MP steam pressure.

The invention is described more fully herein with reference to the accompanying drawings, in which embodiments of the invention are shown. In the drawings, the absolute and relative sizes of systems, components, layers, and regions may be exaggerated for clarity. Embodiments may be described with reference to schematic and/or cross-section illustrations of possibly idealized embodiments and intermediate structures of the invention. In the description and drawings, like numbers refer to like elements throughout. Relative terms as well as derivatives thereof should be construed to refer to the orientation as then described or as shown in the drawing under discussion. These relative terms are for convenience of description and do not require that the system be constructed or operated in a particular orientation unless stated otherwise.

For the purpose of clarity and a concise description, features are described herein as part of the same or separate embodiments, however, it will be appreciated that the scope of the invention may include embodiments having combinations of all or some of the features described.

EXAMPLES

The invention will now be illustrates according to the following non-limiting examples.

Figure 1:
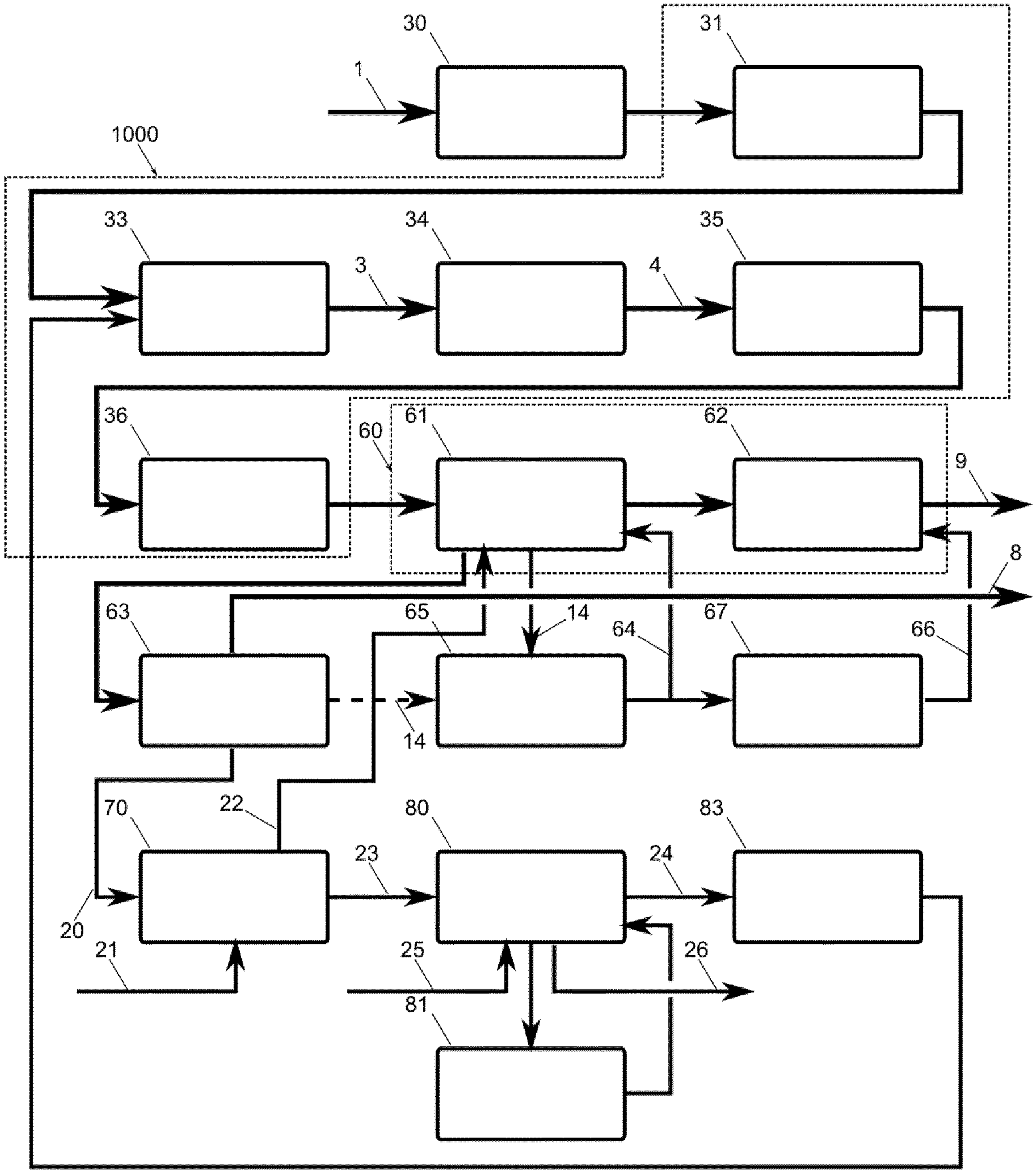
FIG. 1 depicts an example of a scheme for a (hot part of) a conventional, fired, ethylene plant for gaseous hydrocarbon feedstocks.
Figure 2:
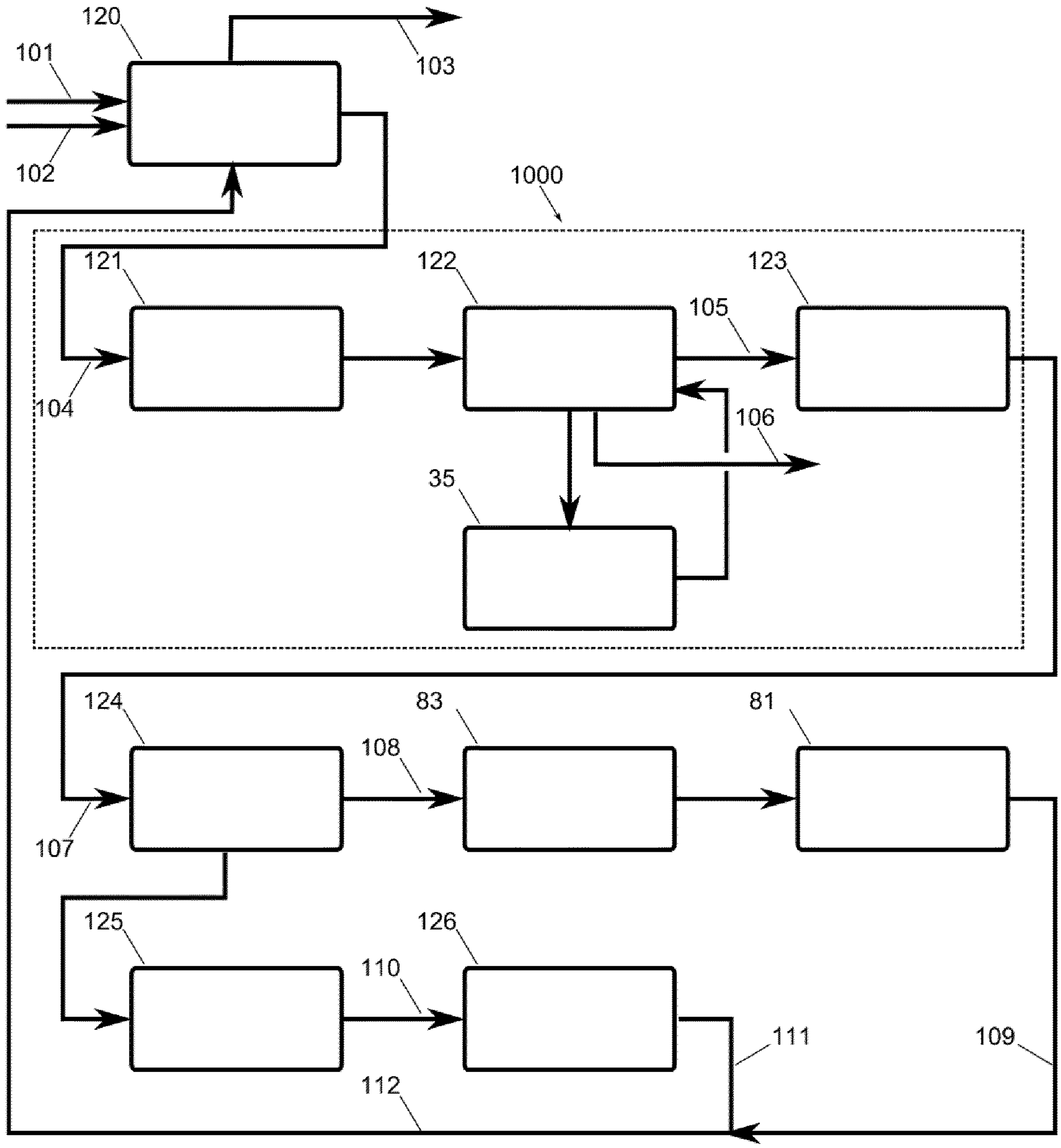
FIG. 2 depicts an integrated power generation scheme of a conventional ethylene plant.
Figure 3:
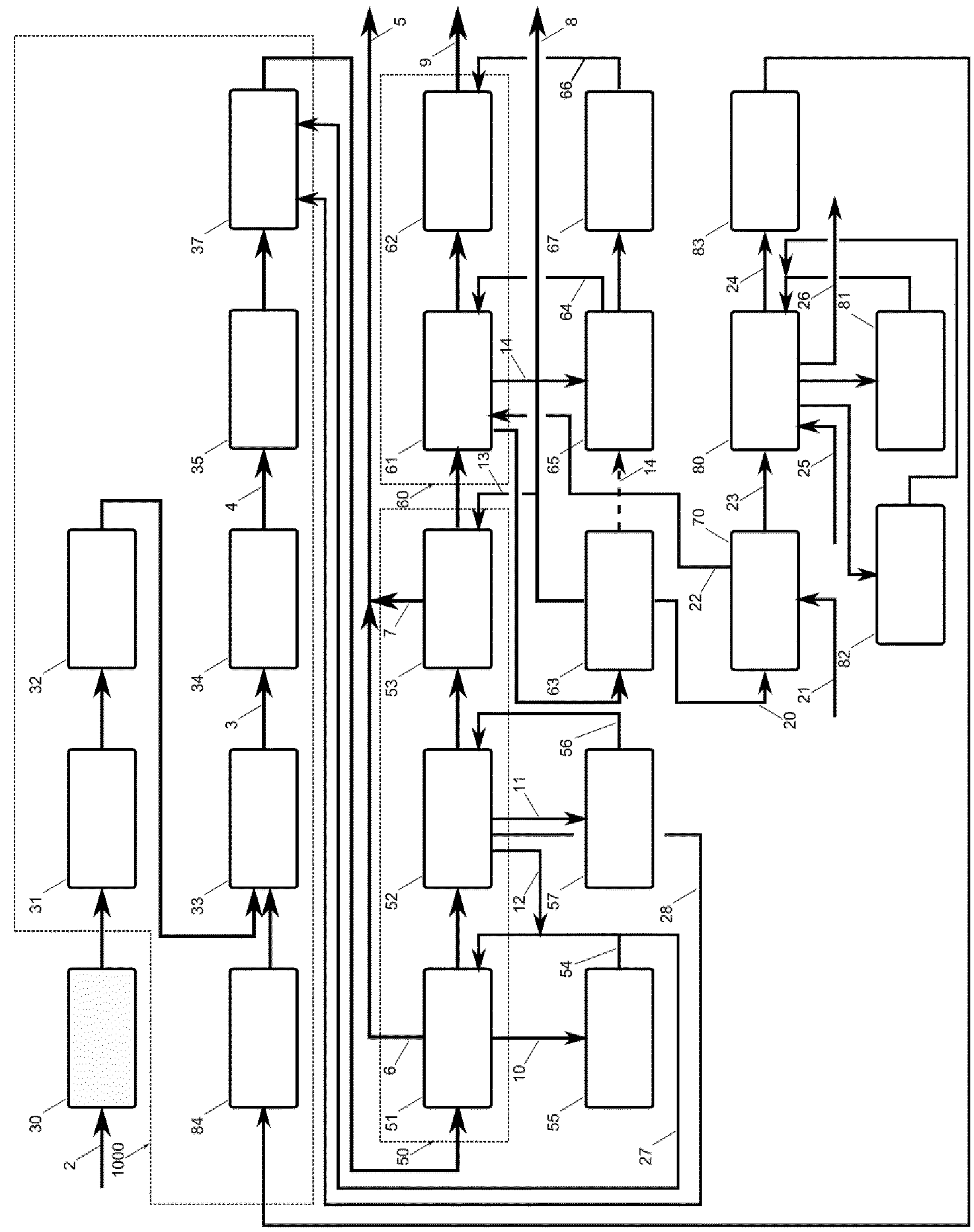
FIG. 3 schematically illustrates a hot section of an ethylene plant in accordance with the invention.
Figure 9:
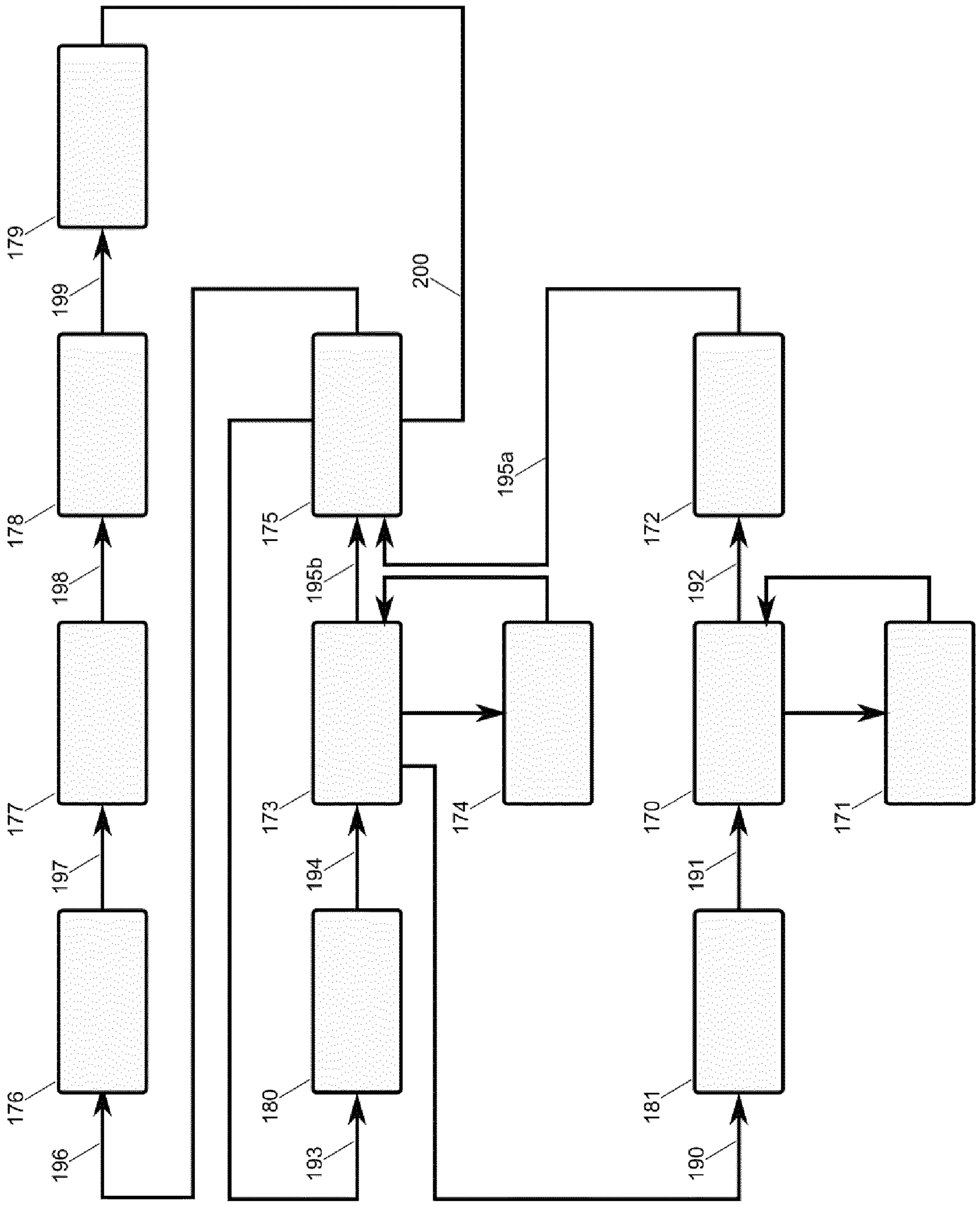
FIG. 9 schematically illustrates aspects relating to a heat bump of an ethylene plant/process in accordance with the invention.

To demonstrate how the invention can be applied a number of examples have been prepared for a gaseous feedstock cracker: a comparative example 1 with a conventional flow scheme as per FIG. 1 to serve as a base case for comparisons; an example 2 with a flowsheet containing a primary fractionator and a humidifier/saturator as per FIG. 6; an example 3 with a flowsheet containing an low pressure humidifier/saturator and diluted feedstock compressor as per FIG. 7; and an example 4 with a flowsheet as per FIG. 8 containing heat pump as per FIG. 9.

As base case a 1500 kilotons per annum (kta) ethane cracker has been selected. Unconverted ethane and propane are recycled back to the furnace section as recycle gas and mixed with the fresh gaseous feedstock. This combined feedstock is handled in the cracking furnaces for all the examples.

Example 1, the base case for comparisons, has a gaseous feedstock of 359.8 t/h, 233.5 t/h of fresh ethane feedstock and 126.3 t/h of recycle gas, predominantly recycle ethane. This is supplied at 20° C. and heated up to 55° C. in hydrocarbon feedstock preheater 30. In the convection section of the furnace the feedstock is further heated up to 225° C. in hydrocarbon feedstock preheater 31. Dilution steam of 180° C. is added to dilute the feedstock. The diluted feedstock is heated up to 703° C. in the steam diluted hydrocarbon feedstock superheater 33. At 4 bara the diluted gas is fed via critical flow venturis a large number of parallel radiant coils in the cracking furnace, the pyrolysis reactor inside fuel fired furnace firebox 34, where it is heated up to 855° C. The pressure at the outlet of the reactor is 1.8 bara. During this process the feedstock is converted to products. Conversion doesn't stop at the exit of the reactor, but continues in the passage way to the transfer line exchanger 35 and in this transfer line exchanger itself. In the passage way from the coils to the transfer line exchanger the temperature drops due to the endothermic reaction to a temperature of 840° C. In the transfer line exchanger the pyrolysis reactor effluent 4 (also referred to as cracking product) is cooled to 350° C., generating high pressure steam. Next the effluent is further cooled to 180° C. in a secondary transfer line exchanger 36, while heating of boiler feed water.

The effluent is further cooled in the quench water tower 60 to 30° C. to yield a cracked gas product 9. During this process the dilution steam is condensed along with a small quantity of gasoline 8. The gasoline/sour water mixture is separated in the gasoline water separator at 80° C. The sour water 20 is pumped to sour water stripper 70, where it is stripped to remove dissolved sour gases 22 at 1.7 bara. The cleaned process water 23 is pumped to the dilution steam drum 80, where dilution steam 24 is generated at 6 bara and 160° C. from condensing MP steam. The dilution steam is superheated to 180° C. in the superheater 83 by superheated MP steam. The superheated dilution steam is sent to the furnace to dilute the gaseous feedstock 1. The quantity of dilution steam generated is 125.9 t/h. This means that the steam dilution ratio is 0.35 (125.9 t/h/359.8 t/h feedstock). In addition, 12.5 t/h of sour water strip steam 21 is generated for stripping the sour water.

Example 2 uses the same gaseous feedstock of 359.8 t/h. This is supplied at 20° C. at the bottom of the saturator 150, operating at 6 bara. In the saturator the gas is contacted with 140° C. circulating saturator water entering at the top of the saturator. This is the temperature that is practically possible with 150° C. quench oil and 77° C. quench water heating the saturator circulation water 151.

Part of the process water, 103 t/h, is mixed with the circulating saturator water. This is the quantity to make up the quantity of water evaporated in the saturator. The rest of the process water is sent to the dilution steam drum 80 with the electric boiler 80, to generate the 22.8 t/h dilution steam generated at 6 bara and 160° C. to raise the total steam dilution to 125.9 t/h, corresponding steam dilution ratio is 0.35 (125.9 t/h/359.8 t/h feedstock). In addition, 12.5 t/h of sour water strip steam 21 is generated for stripping the sour water.

The saturated steam diluted ethane 3 is sent at a temperature of 123° C. to the feed-effluent exchanger 90 in the electrically-powered cracking furnace section 1001, where it is heated up to 703° C., before it enters the electrically-powered pyrolysis reactor 91. In the pyrolysis reactor the diluted feedstock is heated up to 855° C. The pressure at the outlet of the reactor is 1.8 bara. In the passage way from the reactor to the feed-effluent exchanger the temperature drops due to the endothermic reaction to a temperature of 840° C. In the feed-effluent exchanger the pyrolysis reactor effluent 4 (also referred to as cracking product) is cooled to 330° C. against the diluted hydrocarbon feedstock 3.

The effluent is further cooled in the quench oil fitting 37 to 170° C. and in the primary fractionator 50 to 120° C. using circulating quench oil 54. A small quantity of liquid heavy fuel oil 6 is condensed in the primary fractionator. The bottom of the primary fractionator is operated at 150° C., to be able to generate a 150° C. quench oil stream. This quench oil is cooled to 110° C. to control the primary fractionator top temperature at 120° C. This quench oil is fully used to heat up the saturator circulation water 151 to 140° C., as already mentioned above, using quench oil circuit cooler 55 (via saturator water circuit heater on quench oil duty 153).

Finally the effluent is cooled in the quench water tower 60 to 30° C. using circulating quench water 64 and 66 to yield a cracked gas product 9. The tower is operated at 77° C., just below the dew point. The quench water bottom circuit cooler 65 (via saturator water circuit heater on quench water 152) is used to heat up the saturator circulation water 151 to 72° C. before it enters the saturator water circuit heater on quench oil duty 153.

In the quench water tower, the dilution steam is condensed along with a small quantity of gasoline 8. The gasoline/sour water mixture is separated in the gasoline water separator at 80° C. The sour water 20 is pumped to sour water stripper 70, where it is stripped to remove dissolved sour gases 22 at 1.7 bara. The cleaned process water is pumped to the saturator 150 and dilution steam drum 80.

Example 3 has the same gaseous feedstock of 359.8 t/h. This is supplied at 20° C. at the bottom of the saturator 150. Contrary to the previous example this tower is not operating at 6 bara, but at 1.1 bara. In the saturator the gas is contacted with 75° C. circulating saturator water entering at the top of the saturator. This is the temperature that is practically possible with 80° C. quench water heating the saturator circulation water 151.

Part of the process water, 125.9 t/h, is mixed with the circulating saturator water. This is the quantity to make up the quantity of water evaporated in the saturator. This is corresponding to a steam dilution ratio of 0.35 (125.9 t/h/359.8 t/h feedstock). The rest of the process water is sent to the dilution steam drum 80 with the electric boiler 80, to generate the 12.5 t/h sour water strip steam.

The steam diluted ethane 3 is compressed to 6 bara in the saturated gaseous feedstock compressor 154 raising the temperature from 74° C. to 214° C. The compressed gas is sent to the feed-effluent exchanger 90 in the electrically-powered cracking furnace section 1001, where it is heated up to 703° C., before it enters the electrically-powered pyrolysis reactor 91. In the pyrolysis reactor the diluted feedstock is heated up to 855° C. The pressure at the outlet of the reactor is 1.8 bara. In the passage way from the reactor to the feed-effluent exchanger the temperature drops due to the endothermic reaction to a temperature of 840° C. In the feed-effluent exchanger the pyrolysis reactor effluent 4 (also referred to as cracking product) is cooled to 400° C. against the diluted hydrocarbon feedstock 3.

The effluent is further cooled in the quench water tower 60 to 30° C. using circulating quench water 64 and 66 to yield a cracked gas product 9. The tower is operated at 80° C. The quench water bottom circuit cooler 65 (via saturator water circuit heater on quench water 152) is used to heat up the saturator circulation water 151 to 75° C.

In the quench water tower, the dilution steam is condensed along with a small quantity of gasoline 8. The gasoline/sour water mixture is separated in the gasoline water separator at 80° C. The sour water 20 is pumped to sour water stripper 70, where it is stripped to remove dissolved sour gases 22 at 1.7 bara. The cleaned process water is pumped to the saturator 150 and dilution steam drum 80.

Example 4 has the same gaseous feedstock of 359.8 t/h as the other cases. This is supplied at 20° C. and heated up to 75° C. in hydrocarbon feedstock preheater 30. Dilution steam of 200° C. is added to dilute the feedstock. The diluted feedstock is sent to the feed-effluent exchanger 90 in the electrically-powered cracking furnace section 1001 and heated up to 703° C., before it enters the electrically-powered pyrolysis reactor 91. In the pyrolysis reactor the diluted feedstock is heated up to 855° C. The pressure at the outlet of the reactor is 1.8 bara. In the passage way from the reactor to the feed-effluent exchanger the temperature drops due to the endothermic reaction to a temperature of 840° C. In the feed-effluent exchanger the pyrolysis reactor effluent 4 (also referred to as cracking product) is cooled to 316° C. against the diluted hydrocarbon feedstock 3.

The effluent is further cooled in the quench water tower 60 to 30° C. using circulating quench water 64 and 66 to yield a cracked gas product 9. The tower is operated at 80° C. The quench water bottom circuit cooler 65 (via saturator water circuit heater on quench water 152) is used to heat up the saturator circulation water 151 to 75° C.

In the quench water tower, the dilution steam is condensed along with a small quantity of gasoline 8. The gasoline/sour water mixture is separated in the gasoline water separator at 80° C. The sour water 20 is pumped to sour water stripper 70, where it is stripped to remove dissolved sour gases 22 at 1.7 bara. The cleaned process water is pumped to the dilution steam drum 80 with the dilution steam generator using condensing refrigerant 86 to generate the 125.9 t/h dilution steam generated at 6 bara and 160° C. required to have a dilution steam ratio corresponding to 0.35 (125.9 t/h/359.8 t/h feedstock). In addition, 12.5 t/h of sour water strip steam 21 is generated for stripping the sour water. The dilution steam is superheated in the dilution steam superheater 87 using superheated refrigerant.

Using the low and the medium pressure refrigerant vaporizers 171,174, refrigerant vapour is generated at 62.5° C. and 70° C., respectively, by two quench water bottom circuit coolers 65. One cooling quench water from 80° C. to 75° C. and one cooling further to 67° C. Using low to medium pressure and medium to high pressure compressors 172,176, respectively, high pressure superheated refrigerant vapor of 216° C. is generated. This is used to superheat the dilution steam in dilution steam superheater 87 (via high pressure refrigerant de-superheater 177) and to generate dilution steam itself in the dilution steam generator using condensing refrigerant 86 (via high pressure refrigerant condenser 178).

Table 1 shows an overview of the duties for the various examples, along with the power of the relevant compressors.

TABLE 1

| Duty/power for the various cases | | | | |
|---|---|---|---|---|
| Duty/power (MW) | # 1 | # 2 | # 3 | # 4 |
| Hydrocarbon feedstock preheating | 45.1 | | | 10.5 |
| Steam diluted feedstock superheating | 201.0 | 229.3 | 200.6 | 234.0 |
| Pyrolysis reactor | 349.1 | 349.1 | 349.1 | 349.1 |
| Pyrolysis reactor effluent cooling | −287.3 | −233.9 | −204.6 | −238.7 |
| Quench oil circuit coolers | | −74.5 | | |
| Quench water bottom circuit coolers | −82.7 | −63.2 | −166.6 | −131.8 |
| Quench water top circuit coolers | −38.7 | −37.5 | −37.1 | −37.7 |
| Dilution steam generation by MP steam | 88.7 | | | |
| Dilution steam generation by electric boiler | | 24.0 | 9.2 | |
| Dilution steam generator by refrigerant | | | | 88.7 |
| Dilution steam superheating by MP steam | 1.6 | | | |
| Dilution steam superheating by Refrigerant | | | | 3.2 |
| Saturator water circuit heater on quench water | | 9.0 | 85.2 | |
| Saturator water circuit heater on quench oil duty | | 74.5 | | |
| Steam diluted feedstock compression | | | 40.4 | |
| Low pressure refrigerant evaporation | | | | 20.3 |
| Medium pressure refrigerant evaporation | | | | 35.2 |
| Low to medium pressure refrigerant compression | | | | 1.1 |
| Medium to high pressure refrigerant compression | | | | 35.2 |
| Dilution steam generation and superheating | | | | 91.9 |

Table 2 shows the electric power demand for the various examples and the potential reduction of the excess power as defined above, when comparing the electric power demand for diluting the feedstock with that required for the dilution steam generation in the traditional way as calculated for example 1, namely 90.3 MW in the absence of MP steam. It shows that the FIG. 6 flow sheet (example 2) has the highest reduction potential, 73%. The FIG. 7 flow sheet (example 3) has a reduction value, 45%. The flow sheet of FIGS. 8 and 9 (example 4) has an intermediate level at 60%.

TABLE 2

| Electric power demand for the various cases | | | | |
|---|---|---|---|---|
| Electric power demand (MW) | # 1 | # 2 | # 3 | # 4 |
| Pyrolysis reactor | * | 349.1 | 349.1 | 349.1 |
| Electric power demand in the absence of MP steam | 90.3 | 24.0 | 49.6 | 36.4 |
| Power reduction | n/a | 73% | 45% | 60% |

* heat supplied by fuel firing

LEGEND TO THE FIGURES

1. Hydrocarbon feedstock (gaseous)
2. Hydrocarbon feedstock (liquid)
3. Steam diluted hydrocarbon feedstock
4. Pyrolysis reactor effluent (also referred to as cracking product)
5. Total fuel oil product
6. Heavy fuel oil product
7. Light fuel oil product
8. Heavy pyrolysis gasoline
9. Cracked gas product (leaving the hot section, cooled/washed)
10. Quench oil
11. Middle oil
12. Middle oil reflux
13. Gasoline reflux
14. Quench water
20. Sour water
21. Stripping steam
22. Sour gases
23. Process water
24. Dilution steam
25 Dilution steam system make-up
26. Blow down
27 Quench oil to quench fitting
28. Middle oil to quench fitting
30. Hydrocarbon feedstock preheater external to the furnace
31. Hydrocarbon feedstock preheater in furnace convection section
32. Hydrocarbon feedstock evaporator in furnace convection section
33. Steam diluted hydrocarbon feedstock superheater in furnace convection section
34. Pyrolysis reactor inside fuel fired furnace firebox
35. Transfer line exchanger generating high pressure steam
36. Secondary transfer line exchanger
37. Quench oil fitting
43. Hydrocarbon feedstock preheater by middle oil
44. Hydrocarbon partial feedstock evaporator by middle oil
45. Hydrocarbon feedstock drum
46. Hydrocarbon feedstock evaporator by quench oil
47. Hydrocarbon feedstock superheater by quench oil
48. Hydrocarbon feedstock evaporator by condensing refrigerant
49. Hydrocarbon feedstock superheater by refrigerant
50. Primary fractionator
51. Primary fractionator wash section
52. Primary fractionator middle oil section
53. Primary fractionator gasoline reflux section
54. Quench oil cooling circuit
55. Quench oil circuit coolers
56. Middle oil cooling circuit
57. Middle oil circuit coolers
60. Quench water tower
61. Quench water tower bottom section
62. Quench water tower top section
63. Gasoline/water separator
64. Quench water bottom cooling circuit
65. Quench water bottom circuit coolers
66 Quench water top cooling circuit
67. Quench water top circuit coolers
70. Sour water stripper
80. Dilution steam drum
81. Dilution steam generator using MP steam
82. Dilution steam generator using quench oil
83. Dilution steam superheater external to the furnace
84. Dilution steam superheater in furnace convection section
85. Electric boiler
86. Dilution steam generator using condensing refrigerant
87. Dilution steam superheater using refrigerant
90. Feed-effluent exchanger
91. Electrically-powered pyrolysis reactor
101. Demin water make-up
102. Strip steam
103. Deaerator vent
104. Boiler feed water
105. Saturated high pressure steam
106. Steam drum blow-down
107. Superheated high pressure steam
108. Medium pressure steam
109. Medium pressure condensate
110. Condensing steam at vacuum
111. Vacuum condensate
112. Combined condensate
120. Deaerator
121. Boiler feed water preheater
122. High pressure steam drum
123. High pressure steam superheater
124. Back pressure steam turbine high pressure to medium pressure
125. Condensing steam turbine medium pressure to vacuum
126. Condensing steam turbine surface condenser
150. Saturator
151. Saturator water heating circuit
152. Saturator water circuit heater on quench water
153. Saturator water circuit heater on quench oil duty
154. Saturated gaseous feedstock compressor
170 Low pressure refrigerant drum
171. Low pressure refrigerant vaporizer
172. Low to medium pressure refrigerant compressor
173. Medium pressure refrigerant drum
174. Medium pressure refrigerant vaporizer
175. High pressure refrigerant economizer
176. Medium to high pressure refrigerant compressor
177. High pressure refrigerant desuperheater

178. High pressure refrigerant condenser
179. High pressure condensed refrigerant drum
180. Liquid refrigerant depressurization valve to medium pressure
181. Liquid refrigerant depressurization valve to low pressure
182. High-high pressure refrigerant economizer
183. Medium to high-high pressure refrigerant compressor
184. High to high-high pressure refrigerant compressor
185. High-High pressure refrigerant desuperheater
186. High-high pressure refrigerant condenser
187. High-high pressure condensed refrigerant drum
190. Saturated medium pressure refrigerant liquid
191. Flashing low pressure refrigerant
192. Low pressure saturated refrigerant vapor
193. Medium pressure slightly superheated refrigerant vapor
194 Medium pressure saturated refrigerant vapor
195*a*. Medium pressure slightly superheated refrigerant vapor
195*b*. Medium pressure saturated refrigerant vapor
196. Medium pressure superheated refrigerant vapor
197. High pressure superheated refrigerant vapor
198. High pressure de-superheated refrigerant vapor
199. Condensed high pressure refrigerant liquid
200. Saturated high pressure refrigerant liquid
201. High pressure superheated refrigerant vapor
202. High pressure superheated refrigerant vapor
203. High-high pressure de-superheated refrigerant vapor
204. Condensed high-high pressure refrigerant liquid
205. Saturated high-high pressure refrigerant liquid
1000. Fired cracking furnace
1001. Electrically-powered cracking furnace section
1010. High pressure refrigeration circuit branch
1011. High-high pressure refrigeration circuit branch

The invention claimed is:

1. An ethylene plant, comprising an electrically-powered pyrolysis reactor, which electrically-powered pyrolysis reactor comprises a feed inlet for a hydrocarbon feedstock-diluent mixture and an outlet for a pyrolysis reactor effluent comprising ethylene, the ethylene plant further comprising a heat exchanger configured to transfer heat from the pyrolysis reactor effluent to the feed for the pyrolysis reactor, the heat exchanger comprising a feed inlet and a feed outlet upstream of the pyrolysis reactor, and further a pyrolysis reactor effluent inlet and a pyrolysis reactor effluent outlet, wherein a feed passage way is present between the feed outlet of the heat exchanger and the feed inlet of the pyrolysis reactor and further a feed passage way is present between the reactor effluent outlet of the pyrolysis reactor and a cracked gas inlet of the heat exchanger, wherein the plant comprises a humidifier to provide the hydrocarbon feedstock-diluent mixture by saturating hydrocarbon feedstock with process water originating from the heat exchanger, and wherein the humidifier is upstream of the feed inlet of the heat exchanger.

2. The ethylene plant according to claim 1, wherein the plant further comprises a cooling section configured to further cool reactor effluent produced in the pyrolysis reactor to about ambient conditions without high pressure steam generation, which cooling section is downstream of a cracked gas outlet of the heat exchanger.

3. The ethylene plant according to claim 2, wherein the cooling section comprises a cooling system selected from the group of quench water cooling systems configured to further cool the reactor effluent with quench water and air coolers configured to further cool the reactor effluent with air; optionally wherein the cooling section comprises a quench oil cooling system configured to further cool reactor effluent with quench oil upstream of the quench water cooling system or air cooler.

4. The ethylene plant according to claim 1, wherein the plant comprises a compressor configured to pressurize the humidified hydrocarbon feed, which compressor is present in a humidified hydrocarbon feed passage way between an outlet for humidified hydrocarbon feed of the humidifier and the feed inlet of the heat exchanger configured to transfer heat from the cracked gas from the pyrolysis reactor to the feed for the pyrolysis reactor.

5. The ethylene plant according to claim 4, wherein the plant further comprises a cooling section configured to further cool reactor effluent produced in the pyrolysis reactor to about ambient conditions without high pressure steam generation, which cooling section is downstream of a cracked gas outlet of the heat exchanger;

wherein the cooling section comprises a cooling system selected from the group of quench water cooling systems configured to further cool the reactor effluent with quench water and air coolers configured to further cool the reactor effluent with air; and wherein the cooling section comprises a quench oil cooling system configured to further cool reactor effluent with quench oil, upstream of the quench water cooling system or air cooler;

the plant further comprising a heat exchanger configured to transfer heat from the quench oil to the water for humidifying the hydrocarbon feedstock in the humidifier, which heat exchanger comprises a quench oil passage way and a water passage way, wherein the quench oil passage way has an inlet for quench oil which is connected to a quench oil outlet of the quench oil cooling system via a passage way configured to transfer quench oil from the quench oil cooling system to said heat exchanger and a quench oil outlet connected to a quench oil inlet of the quench oil cooling system via a quench oil recycle passage way, and wherein the water passage way of the heat exchanger has an inlet for water to be heated in said heat exchanger and an outlet for water connected to a water inlet of the humidifier.

6. The ethylene plant according to claim 1, wherein the plant comprises a dilution steam generator, comprising a heat pump system configured to generate the dilution steam, optionally, wherein the heat pump system has multiple heat sources, multiple sinks or both; further optionally, wherein the plant comprises a heat exchanger to preheat the hydrocarbon feedstock upstream of the feed inlet of the heat exchanger upstream of the pyrolysis reactor, which heat exchanger is configured to receive heat from one or more of quench water, quench oil, and middle oil, used to cool pyrolysis reactor effluent.

7. The ethylene plant according to claim 5, comprising a hydrocarbon feed evaporator configured to receive heat from quench oil used in a quench oil cooling system for evaporation of the hydrocarbon feed, which quench oil cooling system is configured to further cool pyrolysis reactor effluent with quench oil, or configured to receive condensation heat from a vaporous refrigerant (of the heat pump for evaporation of the hydrocarbon feed.

8. The ethylene plant according to claim 7, wherein the hydrocarbon feed evaporator is configured to receive at least part of the heat for the evaporation of the hydrocarbon feed from middle oil used in a quench oil cooling system, which middle oil cooling system is configured to further cool pyrolysis reactor effluent with middle oil.

9. The ethylene plant according to claim 1, wherein the plant comprises an electric power connection configured to provide electricity to the electrically-powered pyrolysis reactor, which electric power connection is a connection to an electric power system to produce electric power from a renewable source.

10. A process for producing a pyrolysis reactor effluent comprising ethylene from a hydrocarbon feed using an ethylene plant according to claim 1, comprising feeding a hydrocarbon feedstock-steam mixture to the electrically-powered pyrolysis reactor, cracking the hydrocarbon feedstock in a presence of steam in the electrically-powered pyrolysis reactor of said ethylene plant to produce the pyrolysis reactor effluent comprising ethylene, feeding the pyrolysis reactor effluent to the heat exchanger configured to transfer heat from the pyrolysis reactor effluent to the hydrocarbon feedstock-steam mixture, prior to the cracking of the hydrocarbon feedstock and transferring heat from the pyrolysis reactor effluent to the hydrocarbon feedstock-steam mixture in said heat exchanger, thereby cooling the pyrolysis reactor effluent to a temperature at the heat-exchanger pyrolysis reactor effluent outlet below 500° C.

11. The process according to claim 10, wherein a gaseous hydrocarbon feedstock is used as hydrocarbon feed and wherein the gaseous hydrocarbon feed stock is humidified in a humidifier upstream of the feed inlet of the heat exchanger, thereby providing a hydrocarbon-diluent mixture.

12. The process according to claim 10, wherein a liquid hydrocarbon feedstock is used as hydrocarbon feed, wherein the ethylene plant comprises a cooling section comprising a quench water cooling system, provided with a quench water cooling circuit and a primary fractionator, the primary fractionator comprising a quench oil cooling system, provided with a quench oil cooling circuit and a middle oil section, provided with a middle oil cooling circuit, which cooling circuits are used to preheat and evaporate liquid hydrocarbon feedstock, mixing the evaporated hydrocarbon feedstock with dilution steam and feeding the resultant mixture to the heat exchanger.

13. The process according to claim 10 wherein a mixture of a liquid feedstock and a gaseous hydrocarbon feed stock is used as hydrocarbon feed.

14. The process according claim 10, comprising feeding the hydrocarbon-steam mixture to the heat exchanger, configured to transfer heat from the pyrolysis reactor effluent to the feed for the pyrolysis reactor, at a temperature above the water dewpoint of the hydrocarbon-steam mixture, heating up the hydrocarbon-steam mixture with waste heat from the pyrolysis reactor effluent in said heat exchanger to a suitable inlet temperature for the electrically-powered pyrolysis reactor, feeding the heated-up hydrocarbon-steam mixture from said heat exchanger to the electrically heated pyrolysis reactor, which pyrolysis reactor further heats the heated-up hydrocarbon-steam mixture to a pyrolysis reaction temperature and which pyrolysis reactor provides the heat of reaction for the conversion of the hydrocarbon feed to the cracking product, thereby providing the cracking product, optionally wherein the inlet temperature for the electrically-powered pyrolysis reactor is in a range of 650° C.-730° C. for a gaseous hydrocarbon feedstock or in a range of 570° C.-650° C. for a liquid hydrocarbon feedstock.

15. The process according to claim 10, wherein heat of a refrigeration circuit of the ethylene plant is used for at least one purpose selected from dilution steam generation, feedstock preheating, and evaporation of liquid feedstock for generating dilution steam, preheating liquid feedstock and evaporating liquid feedstock.

16. The ethylene plant of claim 1, further comprising:

a dilution steam drum downstream of the humidifier and upstream of the feed inlet of the heat exchanger to receive the process water and to generate dilution steam to add to the saturating hydrocarbon feedstock to provide the hydrocarbon feedstock-diluent mixture; and an electric boiler downstream of the dilution steam drum and upstream of the feed inlet of the heat exchanger to receive cooled water from the dilution steam drum and to generate additional dilution steam to add to the saturating hydrocarbon feedstock to provide the hydrocarbon feedstock-diluent mixture.

* * * * *